United States Patent
Yoon et al.

(10) Patent No.: US 8,989,733 B2
(45) Date of Patent: Mar. 24, 2015

(54) PREFERRED SYSTEM SELECTION ENHANCEMENTS FOR MULTI-MODE WIRELESS SYSTEMS

(75) Inventors: Young C. Yoon, San Diego, CA (US); Srinivasan Balasubramanian, San Diego, CA (US); Arvind Swaminathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 999 days.

(21) Appl. No.: 12/423,520

(22) Filed: Apr. 14, 2009

(65) Prior Publication Data

US 2010/0015978 A1 Jan. 21, 2010

Related U.S. Application Data

(60) Provisional application No. 61/082,100, filed on Jul. 18, 2008.

(51) Int. Cl.
*H04W 4/00* (2009.01)
*H04W 48/16* (2009.01)
(Continued)

(52) U.S. Cl.
CPC ............... *H04W 48/16* (2013.01); *H04W 8/18* (2013.01); *H04W 48/18* (2013.01); *H04W 88/06* (2013.01)
USPC .................. 455/432.1; 455/432.2; 455/432.3; 455/435.1; 455/435.3; 455/456.1; 455/552.1; 455/553.1; 455/558

(58) Field of Classification Search
CPC ....... H04W 88/06; H04W 8/18; H04W 88/02; H04W 88/10; H04W 48/18; H04W 48/16; H04W 64/00
USPC .......... 455/522.1, 453.1–453.3, 456.1–456.5, 455/414.1, 406, 426.1, 428, 417, 418, 31.2, 455/432.1, 432.2, 432.3, 552.1, 553.1, 455/550.1, 558; 370/335, 342
See application file for complete search history.

(56) References Cited

U.S. PATENT DOCUMENTS 5,625,351 A * 4/1997 Willard et al. ............... 340/7.43
5,870,674 A * 2/1999 English ...................... 455/432.2
(Continued)

FOREIGN PATENT DOCUMENTS

CN 1942011 A 4/2007
CN 101146362 A 3/2008
(Continued)

OTHER PUBLICATIONS

3GPP TR 22.811: "Review of Network Selection Principles" Technical Specification, Jun. 1, 2006, XP040276844 p. 6, lines 18-20 p. 10, line 2.
(Continued)

*Primary Examiner* — Olumide T Ajibade Akonai

(57) ABSTRACT

Systems and methodologies are described that facilitate improved multi-mode system selection in a wireless communication system. As described herein, various techniques can be utilized to synthesize system databases corresponding to disparate groups of radio access technologies (RATs), such as a Public Land Mobile Network (PLMN) list and/or a Preferred Roaming List (PRL), with one or more overlay databases and associated location information to generate a multi-mode list of preferred systems. As described herein, a preferred system listing can be constructed to leverage fine granularity of information in one or more databases while still supporting databases with coarser information. Techniques are additionally described herein for augmenting and/or grouping one or more overlay databases to facilitate a higher available granularity of information for various RATs than that provided in system databases corresponding to the RATs. Techniques are additionally provided for automated generation of preferred system listing based on changes to observed location.

50 Claims, 18 Drawing Sheets

(51) Int. Cl.
*H04W 8/18* (2009.01)
*H04W 48/18* (2009.01)
*H04W 88/06* (2009.01)

(56) References Cited

U.S. PATENT DOCUMENTS

| | | | | |
|---|---|---|---|---|
| 6,529,491 | B1 * | 3/2003 | Chang et al. | 370/335 |
| 6,584,311 | B1 * | 6/2003 | Sorenson et al. | 455/432.1 |
| 7,139,587 | B2 * | 11/2006 | Ishii | 455/552.1 |
| 7,904,060 | B2 * | 3/2011 | Krause | 455/414.1 |
| 8,504,095 | B2 * | 8/2013 | Joo | 455/550.1 |
| 2006/0282554 | A1 | 12/2006 | Jiang et al. | |
| 2008/0182615 | A1 * | 7/2008 | Xue et al. | 455/552.1 |
| 2009/0313041 | A1 | 12/2009 | Eder | |
| 2011/0014913 | A1 * | 1/2011 | Yoon et al. | 455/435.3 |
| 2011/0092208 | A1 * | 4/2011 | Swaminathan et al. | 455/435.3 |

FOREIGN PATENT DOCUMENTS

| | | |
|---|---|---|
| CN | 101204106 A | 6/2008 |
| EP | 1740001 | 1/2007 |
| EP | 1885141 | 2/2008 |
| JP | 2006245738 A | 9/2006 |
| JP | 2007013989 A | 1/2007 |
| JP | 2008042913 A | 2/2008 |
| KR | 20070003715 A | 1/2007 |
| RU | 2323545 C2 | 4/2008 |
| WO | WO03067917 | 8/2003 |
| WO | WO03100647 A1 | 12/2003 |
| WO | 2005106523 A1 | 11/2005 |
| WO | WO-2006109159 A2 | 10/2006 |
| WO | 2007026679 A1 | 3/2007 |
| WO | WO2007127323 | 11/2007 |

OTHER PUBLICATIONS

International Search Report & Written Opinion—PCT/US2009/042380, International Search Authority—European Patent Office—Oct. 5, 2009.

Preferred Roaming List for Multi-mode Terminal 3GPP Draft; SP-030766, 3rd Generation Partnership Project (3GPP), Mobile Competence Centre ; 650, Route Des Lucioles ; F-06921 Sophia-Antipolis CEDEX ; France, v o l . TSG SA, no. Maui; 20031216, Dec. 16, 2003, XP050200898.

Taiwan Search Report—TW098114411—TIPO—Aug. 3, 2012.

* cited by examiner

PREFERRED SYSTEM SELECTION ENHANCEMENTS FOR MULTI-MODE WIRELESS SYSTEMS

CROSS-REFERENCE

This application claims the benefit of U.S. Provisional Application Ser. No. 61/082,100, filed Jul. 18, 2008, and entitled "PREFERRED SYSTEM SELECTION ENHANCEMENTS FOR MULTI-MODE WIRELESS SYSTEMS," the entirety of which is incorporated herein by reference.

BACKGROUND

I. Field

The present disclosure relates generally to wireless communications, and more specifically to techniques for system selection in a wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

As wireless communication technology advances, a growing number of different radio access technologies are being utilized. For instance, many geographic areas are now served by multiple wireless communication systems, each of which can utilize one or more different air interface technologies. In order to increase versatility of wireless terminals in such a network environment, there recently has been an increasing trend toward multi-mode wireless terminals that are able to operate under multiple radio technologies. For example, a multi-mode implementation can enable a terminal to select a system from among multiple systems in a geographic area, each of which may utilize different radio interface technologies, and subsequently communicate with one or more chosen systems Conventionally, system selection in a wireless communication environment is based on priority lists, which list the preferred order in which a terminal is to attempt access to systems in a geographic area. However, such priority lists are generally associated with particular access technologies and/or sets of access technologies (e.g., based on communication standards), and contain formatting and information that are particular to the technologies and/or sets of technologies to which the lists correspond. As a result, a multi-mode terminal can be presented with multiple priority lists corresponding to different radio technologies, each of which contain different formatting and/or sets of information. This can, in turn, lead to difficulty and/or inefficiency in selecting a system from among a group of systems utilizing different access technologies. Accordingly, it would be desirable to implement techniques for multi-mode wireless system selection that mitigate at least the above shortcomings.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying one or more locations associated with a wireless communication environment; obtaining a set of system listing information and a set of associated system priority information; filtering the system listing information with respect to the one or more identified locations; and creating a multi-mode list of preferred systems corresponding to the one or more identified locations at least in part by applying the system priority information to the filtered system listing information.

A second aspect relates to a wireless communications apparatus, which can comprise a memory that stores data relating to one or more locations, one or more system listing databases, and related system priority information. The wireless communications apparatus can further comprise a processor configured to prune the one or more system listing databases with respect to the one or more locations and to create a multi-mode preferred system listing by applying information in the one or more system priority databases to the pruned system listing databases.

A third aspect described herein relates to an apparatus operable in a wireless communication system. The apparatus can comprise means for determining one or more locations within a wireless communication environment; means for obtaining system listing data and system prioritization data; and means for creating a multi-mode list of preferred systems at least in part by pruning the system listing data according to the system prioritization data and the one or more determined locations.

A fourth aspect described herein relates to a computer program product, which can comprise a computer-readable medium that comprises code for causing a computer to identify one or more locations of interest within a wireless communication environment; code for causing a computer to obtain system listing information and system priority information; code for causing a computer to filter the system listing information with respect to the one or more locations of interest; and code for causing a computer to apply the system priority information to the filtered system listing information.

A fifth aspect relates to an integrated circuit, which can execute computer-executable instructions. The instructions can comprise identifying one or more locations of interest, one or more system listing databases, and one or more system priority databases; pruning the one or more system listing databases with respect to the one or more locations of interest; and creating a multi-mode preferred system listing by applying information in the one or more system priority databases to respective pruned system listing databases.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
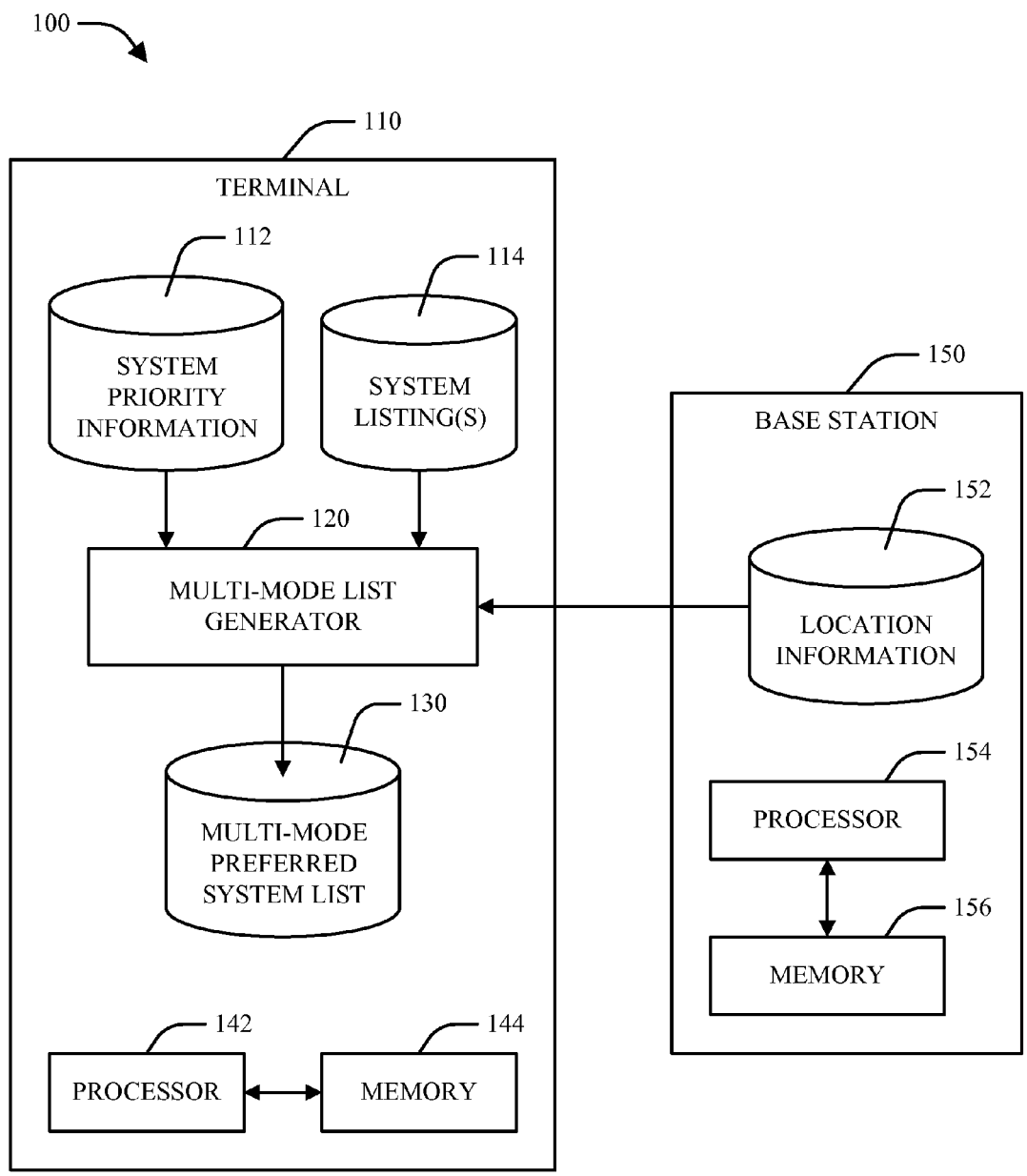
FIG. 1 is a block diagram of a system that facilitates preferred system selection in a multi-mode wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 that facilitates preferred system selection in a multi-mode wireless communication system in accordance with various aspects described herein. As FIG. 1 illustrates, system 100 can include one or more terminals (e.g., access terminals (ATs), mobile terminals, user equipment units (UEs), etc.) 10, which can interact with one or more base stations (e.g., access points (APs), Node Bs, Evolved Node Bs (eNBs), etc.) 150. In one example, base station 150 can engage in one or more downlink (DL, also referred to as forward link (FL)) communications with terminal 110, and terminal 110 can engage in one or more uplink (UL, also referred to as reverse link (RL)) communications with base station 150.

In accordance with one aspect, an area corresponding to system 100 can be served by multiple base stations 150, each of which can provide communication functionality under one or more radio access technologies (RATs). These radio access technologies can include one or more technologies created by various standards organizations. By way of specific example, radio technologies in use in a given geographic area can be implemented in accordance with 3GPP standards such as GSM, General Packet Radio Service (GPRS), Enhanced Data Rates for GSM Evolution (EDGE), UMTS, LTE, or the like; 3GPP2 standards such as IS-95, CDMA2000 (e.g., 1×, Evolution-Data Optimized (EV-DO), etc.), UMB, or the like; IEEE standards such as Wi-Fi, WiMAX, etc.; and/or any other suitable standards In one example, terminal 110 can be capable of multi-mode operation in order to facilitate versatile use of multiple radio access technologies implemented by one or more standards organizations. Multi-mode terminals can be utilized, for example, by a network operator that utilizes multiple networks based on respective disparate air interface technologies. For example, multi-mode terminals can be supported by a network operator that updates a portion of network infrastructure to utilize a new radio access technology but still desires respective terminals to be able to utilize older, legacy portions of the network for increased versatility in different geographical areas and/or network environments.

In accordance with one aspect, a terminal 110 capable of utilizing a variety of networks under different air interface technologies can implement one or more procedures for selecting a preferred system with which to communicate in system 100. In one example, terminal 110 can base system selection on information such as system priority information or listings 112, system listing information 114, and/or location information 152. As illustrated in FIG. 1, system priority information 112 and system listing(s) 114 can be stored locally at terminal 110 and location information can be identified from an associated base station 150; however, it should be appreciated that terminal 110 can obtain such information, and/or any other information suitable for conducting system selection, from any source within or separate from system 100. It should further be appreciated that unless explicitly stated otherwise, the claims appended hereto are not intended to limit to specific location(s) of information.

System priority information 112 and/or system listing(s) 114 can, in one example, be stored at terminal 110 as a set of databases that correspond to respective air interface technologies and/or groups of technologies that can be utilized by terminal 110. Thus, for example, different databases can be provided that correspond to 3GGP technologies, 3GGP2 technologies, IEEE technologies, and/or any other suitable groups of technologies. Such databases can be stored at terminal 110 via a Subscriber Identity Module (SIM) card, a memory, and/or other machine-readable data storage such as a hard disk, memory card, CD-ROM disc, or the like.

In accordance with one aspect, in the event that different databases are utilized by terminal 110, such databases may utilize different, non-overlapping subsets of information, be formatted in different manners, and/or differ in one or more other material ways. As a specific example, terminal 110 can be capable of both 3GPP and 3GPP2 system selection, such that terminal 110 stores system priority information 112 and system listings 114 corresponding to both sets of standards. However, it can be appreciated that while at a high level each set of information 112 and 114 for the respective sets of standards specify priority ordering for selecting a system based on operator, access technology, and/or other information, the low-level designs of such information 112 and 114 for 3GPP and 3GPP2 operation can differ significantly. For example, a system listing 114 for 3GPP may be a very coarse listing, providing only Mobile Country Code (MCC)/Mobile Network Code (MNC) information corresponding to respective 3GPP systems, while system listing for 3GPP2 may be a more comprehensive list that includes system identifiers (SIDs), network identifiers (NIDs), radio frequency (RF)

band-class and/or channel information, acquisition type information, or the like. Further, formatting of system listings 114 and/or priority information 112 may be different in that 3GPP priority information may consist solely of a listing of systems ordered by priority for respective countries (e.g., as specified by corresponding MCCs) and/or other similar areas, while 3GPP2 priority information may be formatted to enable various systems to share priority levels and/or to provide subsets of the priority listing for substantially tighter areas such as geo-spatial locations (GEOs). Accordingly, based on the differences in system priority information 112 and system listings 114 for various technologies and/or groups of technologies, a terminal 110 desiring to create a preferred list of multi-mode systems for one or more locations can encounter difficulty in doing so given individual and separate lists for each mode and/or standard utilized.

Thus, in accordance with one aspect, terminal 100 can include a multi-mode list generator 120, which can synthesize system priority information 112 and system listings 114 corresponding to multiple different standards and/or air interface technologies to generate a single multi-mode preferred system list 130, which can be utilized by terminal 110 to select a system with which to communicate in system 100. By way of specific example, terminal 110 can be capable of operation under one or more 3GPP standards (e.g., LTE), one or more 3GPP2 standards (e.g., CDMA2000), and/or other suitable standards. Based on system priority information 112 and system listings 114 corresponding to such standards, along with location information 152 that relates to one or more geographic locations, terminal 110 can utilize multi-mode list generator 120 to generate a multi-mode preferred system list 130, thereby providing terminal 110 with the capability to find a communication network using any communication technology supported by terminal 110 in one or more locations provided by location information 152.

In one example, multi-mode list generator 120 can generate a multi-mode preferred system list 130 in a versatile manner by incorporating finely granular information provided in given information while still providing support for coarser sets of information. Specific techniques for creating a multi-mode preferred system list are provided in further detail infra.

In another example, location information 152 can correspond to a current location of terminal 110 within system 100. By utilizing the current location of terminal 110, multi-mode list generator 120 can provide terminal 110 with a multi-mode preferred system list 130 that includes various systems that provide coverage for the area at which terminal 110 is located. This can be accomplished, for example, by pruning one or more generalized sets of system priority information 112 and/or system listings 114 to incorporate only information relating to a location of interest for terminal 110. Various multi-mode preferred system lists 130 corresponding to respective locations can be pre-generated and pre-stored at terminal 110, or in one example a multi-mode preferred system list 130 for a particular location (e.g., city, country, etc.) can be automatically generated upon determining that terminal 110 has entered said location.

In accordance with one aspect, terminal 110 can further include a processor 142 and/or memory 144, which can be utilized to implement and/or otherwise facilitate some or all of the functionality of terminal 110 as described herein. Similarly, base station 150 can include a processor 154 and/or memory 156 for facilitating and/or implementing some or all functionality of base station 150 as described herein.

Figure 2:
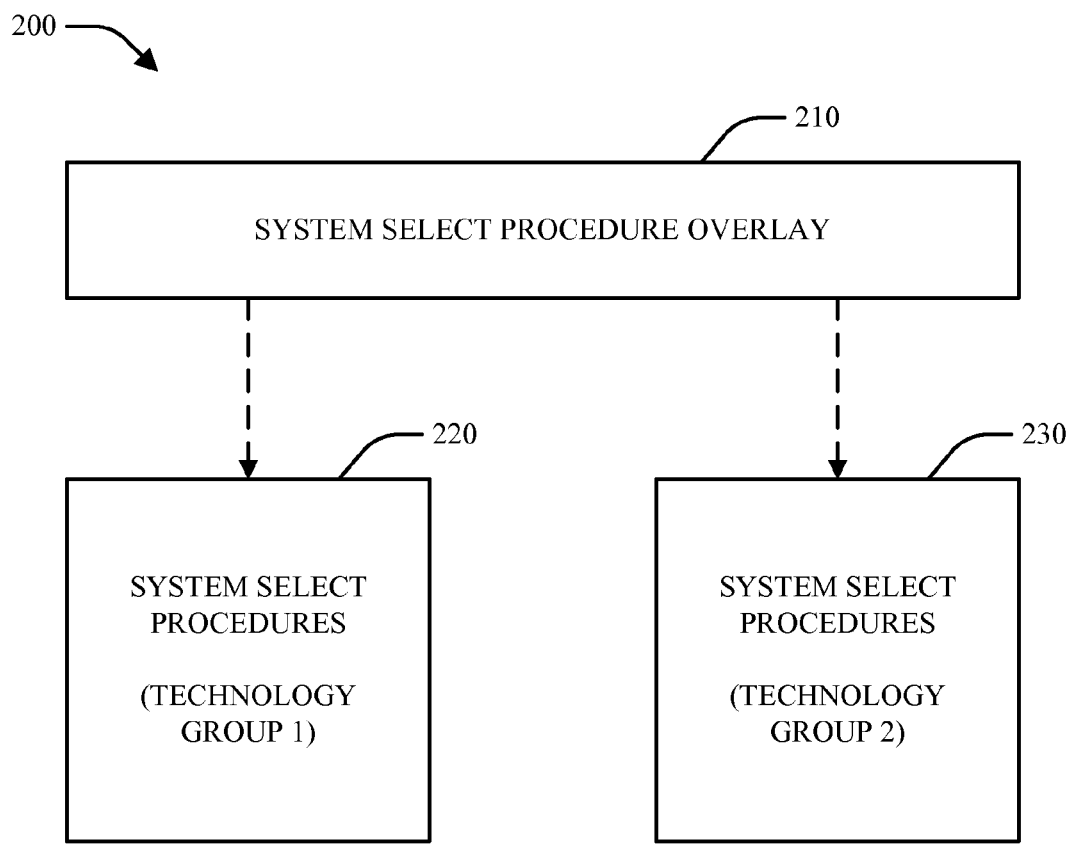
FIG. 2 illustrates an example system select procedure hierarchy that can be utilized in accordance with various aspects described herein.

Turning now to FIG. 2, a diagram 200 is provided that illustrates an example system select procedure hierarchy that can be utilized in accordance with various aspects described herein. In the example illustrated by diagram 200, a set of system select procedures 210-220 can be utilized, each of which can correspond to respective technology groups. Technology groups can correspond to, for example, RATs implemented by respective standards bodies and/or any other appropriate grouping.

In one example, a set of system select procedures 210 and/or 220 can include rules and/or databases utilized by a terminal in selecting a network that utilizes the corresponding technology group. System select procedures can be stored locally at a terminal, provided to a terminal in an on-demand manner from another associated entity, and/or obtained by a terminal in any other suitable manner. In accordance with one aspect, multiple sets of system select procedures 210-220 can be integrated using an overlay 230, which can include one or more rules or databases that are applied on top of individual system select procedures 210-220 to facilitate multi-mode operation between a plurality of technology groups.

Figure 3:
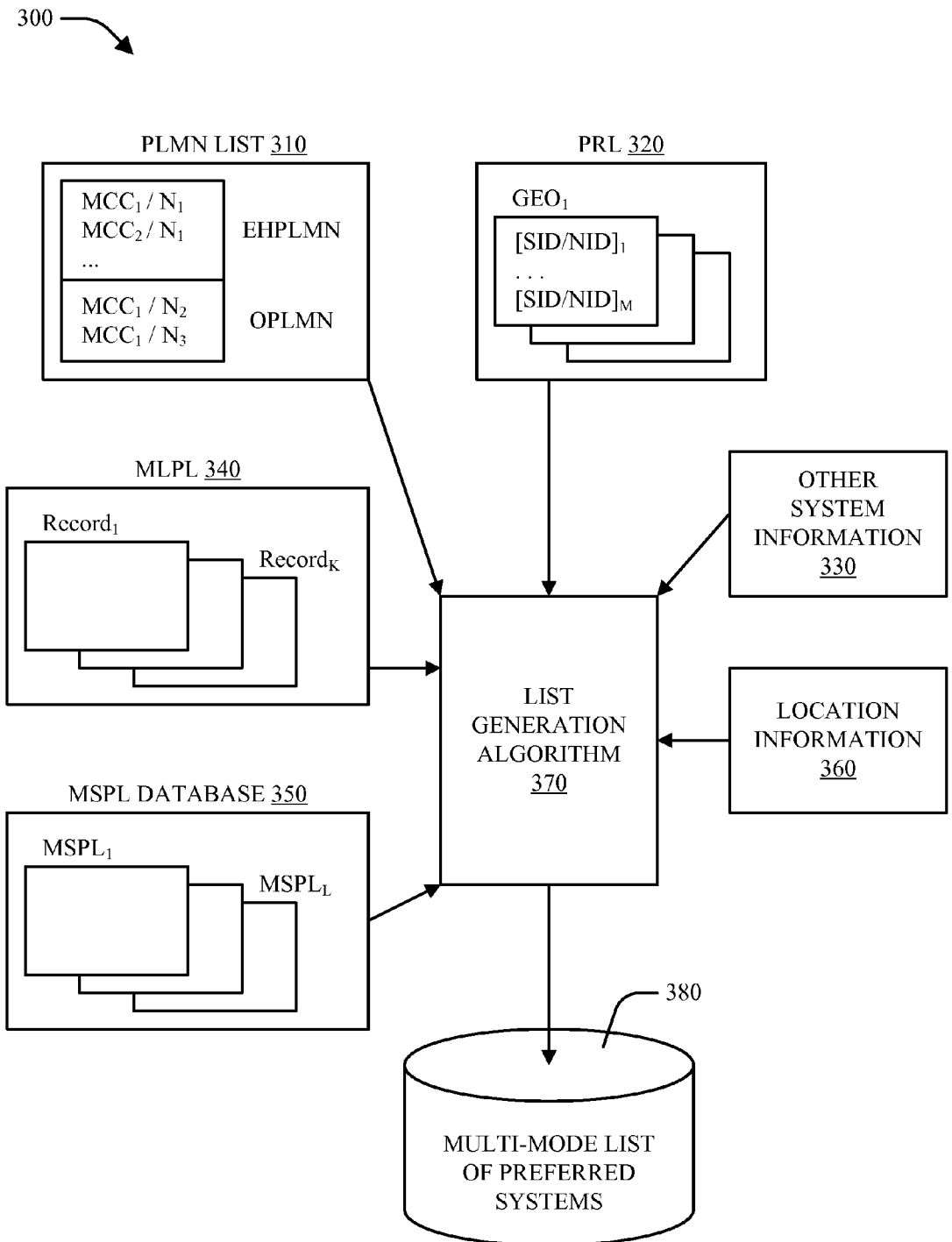
FIG. 3 is a block diagram of a system for generating a multi-mode list of preferred systems in a wireless communication environment in accordance with various aspects.

A specific, non-limiting example of a system select procedure overlay implementation, as well as a specific example of a technique for generating a multi-mode preferred system list, is illustrated by system 300 in FIG. 3. As FIG. 3 illustrates, system select information in the form of databases 310-350 can be utilized by a mobile handset and/or any other suitable device. More particularly, the databases can include a Public Land Mobile Network (PLMN) list 310, a Preferred Roaming List (PRL) 320, one or more other system information databases 330, a Multi-Mode System Selection (MMSS) Location Priority List (MLPL) 340, and a MMSS System Priority List (MSPL) database 350.

In one specific example, PLMN list 310 can include a list of PLMNs and can be configured as a small, coarse network list in order to minimize the amount of space required for its storage. For example, respective networks in PLMN list 310 can be identified using only a MCC corresponding to a country in which the network is located and a MNC corresponding to an operator of the network and placed in PLMN list 310 in decreasing order of priority. It should be appreciated, however, that PLMN list 310 can utilize any suitable formatting and/or information. As further illustrated, PLMN list 310 can be constructed using an Equivalent Home PLMN (EHPLMN) list, which can specify networks classified as home networks, an Operator PLMN (OPLMN) list, which can specify one or more preferred networks, and/or any other suitable lists.

In another specific example, PRL 320 can include a list of systems identified by respective SIDs and/or NIDs. In contrast to PLMN list 310, PRL 320 can be a more granular, detailed list that favors detail of information over storage space requirements. Accordingly, in addition to SID/NID and RAT information, PRL 320 can additionally contain information such as RF band-class and/or channel information, acquisition type information, and/or other information relating to respective systems. Further, PRL 320 can include priority level information that can enable multiple systems to share the same priority level. As further illustrated in FIG. 3, PRL 320 can be grouped into smaller lists for systems located in common geo-spatial locations or GEOs, which can correspond to cities, states, and/or other geographic regions.

Thus, in accordance with one aspect, it can be appreciated that PLMN list 310 and PRL 320 can provide system select procedures for a mobile handset for various radio technologies in a similar manner to system select procedures 210 and 220 in FIG. 2. As system 300 further illustrates, one or more other sets 330 of system select procedures may also be utilized.

In accordance with another aspect, a system select procedure overlay similar to that illustrated in FIG. 2 can be provided in system 300 by way of a MLPL 340 and a MSPL database 350. In one example, MLPL 340 can contain a set of MLPL records, each of which can identify at least one system. In one example, MLPL 340 can include records for systems listed in PLMN list 310, PRL 320, other system information 330, and/or any other suitable listings. Further, each record in MLPL 340 can point to a MSPL in a MSPL database 350. In one example, respective MSPLs in MSPL database 350 can provide rules that specify a priority listing of the systems that point to it.

Figure 4:
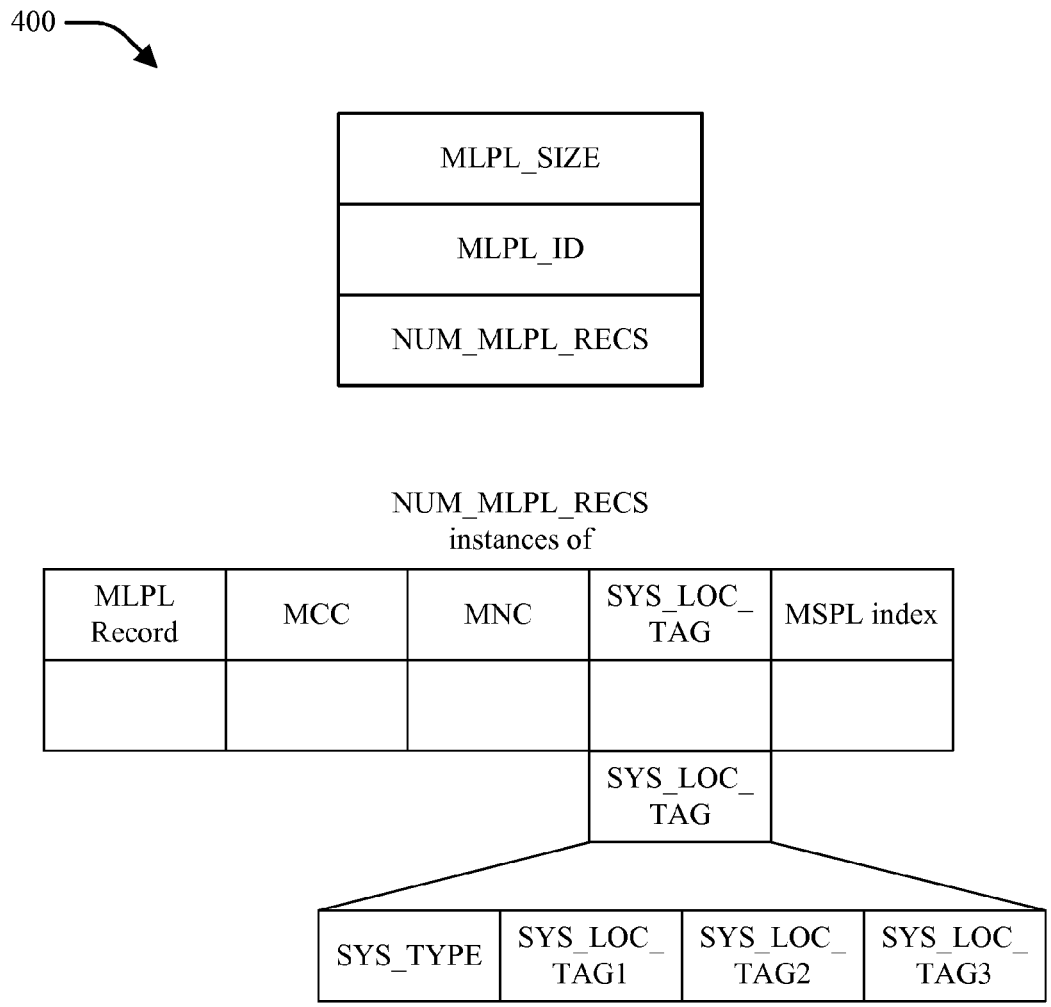
FIG. 4 illustrates an example structure that can be utilized for priority listing information in accordance with various aspects.

In accordance with one aspect, an example structure that can be utilized by MLPL 340 is illustrated by diagram 400 in FIG. 4. As diagram 400 illustrates, an MLPL can contain leading information that includes a MLPL_SIZE field that specifies the size of the MLPL, a MLPL_ID field that identifies the MLPL, and a NUM_MLPL_RECS field that specifies the number of MLPL records that are present in the MLPL. As further illustrated, respective records can include a record index and can identify a corresponding system by its MCC and MNC. Respective records can further include a SYS_LOC_TAG field that includes further information about the corresponding system and a pointer to a MSPL to be utilized for the system.

In the example illustrated by diagram 400, the SYS_LOC_TAG field can include a SYS_TYPE field that identifies the type of the corresponding system as well as three tag fields, respectively referred to as SYS_LOC_TAG1, SYS_LOC_TAG2, and SYS_LOC_TAG3. In one specific example, if a MLPL record corresponds to a cdma2000 system, the SYS_TYPE field can indicate that the system is a cdma2000 system, the SYS_LOC_TAG1 field can indicate the SID of a network or set of networks, the SYS_LOC_TAG2 field can indicate the starting NID for the network(s), and the SYS_LOC_TAG3 field can indicate the NID range for the network(s). Thus, it can be appreciated that a MLPL record as illustrated by diagram 400 can correspond to a single 3GPP system (e.g., as identified by MCC/MNC) or a set of cdma2000 systems with a common SID but a range of NIDs.

Figure 5:
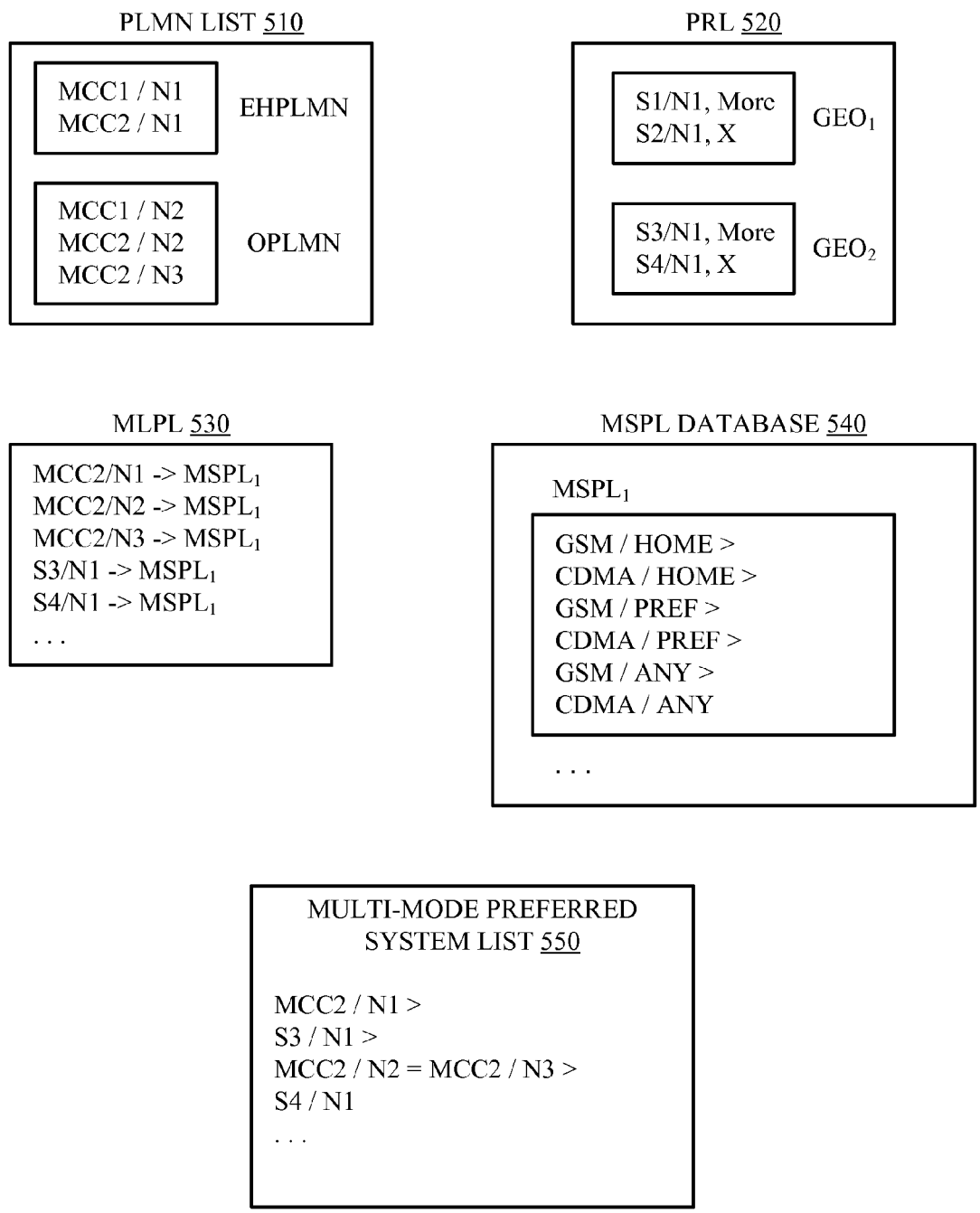
FIG. 5 illustrates an example conventional multi-mode system selection implementation.

Turning now to FIG. 5, a diagram of a system 500 is provided that illustrates an example conventional implementation for multi-mode system selection. As system 500 illustrates, a PLMN list 510, PRL 520, MLPL 530, and MSPL database 540 can be utilized to aid a multi-mode mobile terminal in selecting a system with which to communicate in a wireless communication environment (e.g., via a multi-mode preferred system list 550). However, due to the differences in formatting and information between databases 510-540 as well as the information conventionally provided in databases 510-540, a mobile terminal can still experience difficulty in prioritizing systems across different communication modes. For example, as noted above, PLMN list 510 and PRL 520 can contain differing levels of detail, and while MLPL 530 and MSPL database 540 can serve to overlay PLMN list 510 and PRL 520, such databases generally do not provide sufficient information to alleviate all difficulties encountered by a mobile terminal relating to system selection.

By way of a first specific example, MMSS mechanisms such as that illustrated by system 500 do not allow sufficient flexibility to support complex roaming agreements between respective operators. For example, respective operators can enter into complex roaming agreements between themselves that can evolve with time. Thus, it can be appreciated that a MMSS solution should be flexible enough to interleave systems belonging to different operators to a high degree. However, traditional MMSS mechanisms do not provide sufficient granularity to support such roaming agreements. For example, in the case of 3GPP system selection, a "HOME" priority class is assigned to systems in an EHPLMN list within a PLMN list 510, a "preferred" (or "PREF") priority class is assigned to systems in an OPLMN list, and an "ANY" priority class is assigned to all other usable 3GPP systems. However, it can be appreciated that performing classification in this manner will result in the inability to interleave more than two 3GPP operators into a multi-mode system list 550. Thus, as illustrated by multi-mode preferred system list 550, a priority listing in which system S4/N1 is interleaved between systems MCC2/N2 and MCC2/N3 would not be supported under the implementation shown by system 500, as both MCC2/N2 and MCC2/N3 share the PREF priority level due to their common presence in the OPLMN list.

By way of a second specific example, MMSS mechanisms such as that illustrated by system 500 do not support differentiation between different RATs that may be provided by respective listed networks. Thus, for example, if a high-speed application is to be performed at a multi-mode terminal, the MMSS mechanisms illustrated by system 500 would not support an interleaving wherein RATs that support high-speed services (e.g., LTE, DO, etc.) are prioritized over other RATs (e.g., UMTS, 1×, etc.) that are provided by the same networks.

Thus, returning to FIG. 3, system 300 can mitigate the above difficulties described with respect to system 500 by utilizing a list generation algorithm 370, which can integrate information from databases 310-350 to create a single multi-mode list of preferred systems 380. In one example, list generation algorithm 370 can compile information from databases 310-350 into a single list 380 that contains the detail of PRL 320 while still supporting coarser lists such as PLMN list 310. In another example, list generation algorithm 370 can be designed to expand information provided in PLMN list 310 using MLPL database 340 and/or MSPL database 350, allowing system selection to be conducted with further detail and granularity than is supported by traditional MMSS approaches. In a further example, list generation algorithm 370 can additionally utilize location information 360 to generate a multi-mode list of preferred systems 380 that is specific to a given geographic area. Generation of a list 380 for particular location information 360 can be done in a single action for a set of locations, or in an alternative aspect list generation algorithm 370 can be automatically triggered upon detecting a change in the location of an associated device.

Figure 6:
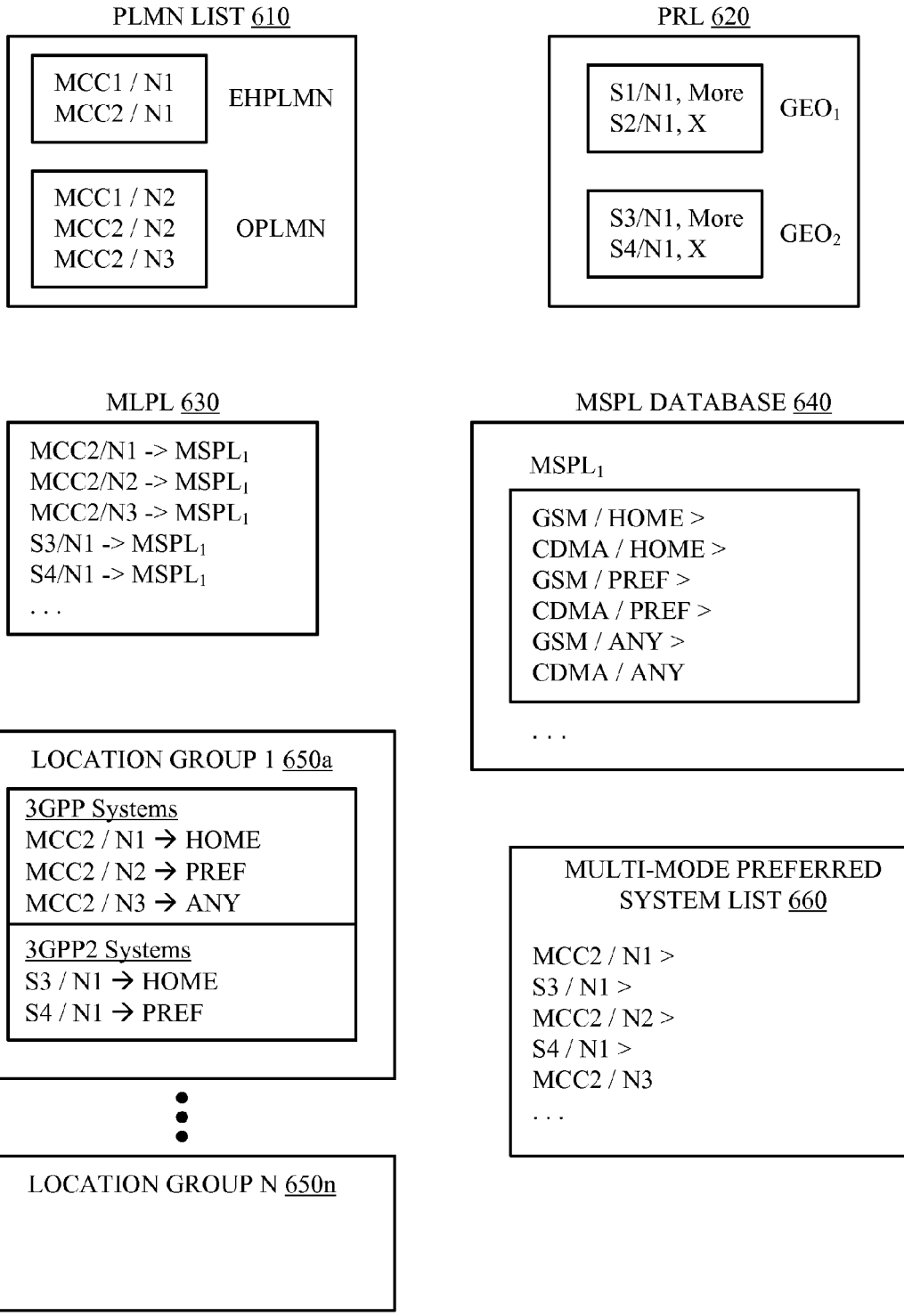
FIG. 6 illustrates an example multi-mode system selection technique that utilizes priority class optimization in accordance with various aspects.
Figure 7:
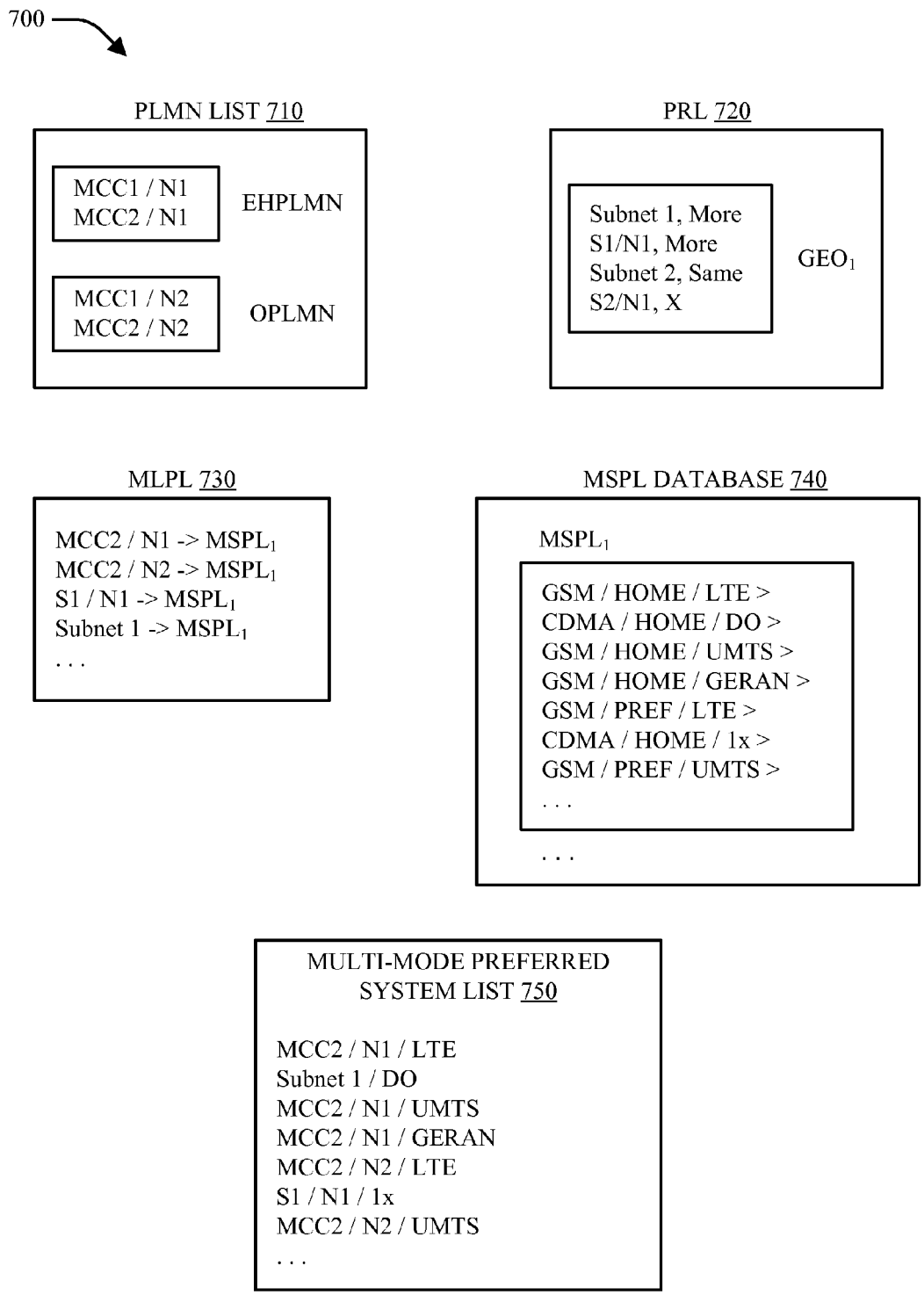
FIG. 7 illustrates an example multi-mode system selection technique that incorporates radio access technology and subnet identifier data in accordance with various aspects.

In accordance with one aspect, various MMSS techniques described herein can mitigate the shortcomings noted above with regard to system 500 in the manners shown by system 600 in FIG. 6 and system 700 in FIG. 7. With reference first to FIG. 6, system 600 can include a PLMN list 610, a PRL 620, a MLPL 630, and a MSPL database 640 that can be compiled to create a multi-mode preferred system list 660. List 660 can be generated for a particular geographic area, which can correspond to a city and/or another area of any suitable granularity. In the example shown in diagram 600, list 660 is generated for $GEO_2$, which is located in a country corresponding to MCC2. However, it should be appreciated that the example illustrated by diagram 600 could be utilized for any suitable area and/or location.

In a similar manner to system 500, PLMN list 610 can include entries corresponding to multiple systems, which can be located in various countries corresponding to respective MCCs and operated by various network operators corresponding to respective MNCs, and PRL 420 can contain entries corresponding to respective systems identified by SID/NID, which can be arranged in separate records defined by GEO. As additionally illustrated, MLPL 630 can provide pointers for various networks to respective corresponding MSPL entries, and MSPL database 640 can provide a priority listing for all systems associated with a particular grouping of networks (e.g., all networks belonging to a country, a GEO, and/or any other granularity of location).

In accordance with one aspect, creation of multi-mode preferred system list 660 can be conducted with additional flexibility and granularity than that illustrated by system 500 by, for example, using a process in which system listing information is pruned by location to create respective location groups 650a-n, which can then be interleaved across all systems according to rules provided by MLPL 630 and MSPL database 640.

In one example, location groups 650 can be generated by pruning and compiling entries in PLMN list 610 and/or PRL 620 with respect to a location of interest. For example, as illustrated in system 600, a location group 650a can be generated by compiling all 3GPP systems (e.g., using PLMN list 610) and all 3GPP2 systems (e.g., using PRL 620) associated with MCC2 and GEO$_2$, respectively. Based upon the respectively generated location groups 650a-n, priority classes associated with systems belonging to respective location groups 650a-n can be defined to optimize interleaving between the respective systems. For example, as illustrated by location group 650a, "HOME" priority can be redefined to refer to the highest preferred 3GPP and 3GPP2 systems in the location group 650a, "PREF" priority can be redefined to refer to the second highest preferred systems, and "ANY" priority can be redefined to refer to all other applicable systems. Additionally, although not illustrated in system 600, priority classes other than "HOME," "PREF," and "ANY" can additionally be utilized for further granularity. By forming location groups 650 in this manner, it can be appreciated that interleaving of systems can be supported with higher complexity than that supported by conventional approaches. For example, in contrast to the mechanisms illustrated by system 500, an interleaving of S4/N1 between MCC2/N2 and MCC2/N3 would be supported by system 600.

With reference next to FIG. 7, a second example system 700 can include a PLMN list 710, a PRL 720, a MLPL 730, and an MSPL database 740 that can be structured in a similar manner to databases 610-640 in FIG. 6 to create a multi-mode preferred system list 750. In accordance with one aspect as illustrated by system 700, MSPLs in MSPL database 740 can be augmented to include RAT information, which can be utilized to mitigate conventional shortcomings associated with interleaving of different RATs provided by a single network. For example, as illustrated by MSPL database 740, DO operation associated with a home CDMA network can be interleaved between LTE and UMTS RATs provided by a home GSM network, and LTE operation of a disparate GSM network can be prioritized between 1× and DO RATs provided by the home CDMA network. It can be appreciated that such an interleaving would not be supported by traditional MMSS approaches, such as that illustrated by system 500 in FIG. 5, as such implementations prioritize all RATs employable by a given network together in a common block. In accordance with another aspect, PRL 720 can be augmented to include support for subnet entries in order to support finer interleaving of networks associated with PRL 720. For example, in traditional MMSS approaches, DO operation for a given system cannot be prioritized separately from 1× operation, as support is provided only for specifying a DO system through an associated 1× system. Thus, by providing separate entries for subnets associated with DO operation in PRL 720, various technologies associated with networks listed in PRL 720 can be given separate priority levels. For example, as shown in multi-mode system priority list 750, a home DO subnet and its associated 1× network can be interleaved separately such that one or more GSM RATs can be prioritized between the DO subnet and the 1× network.

Figure 8:
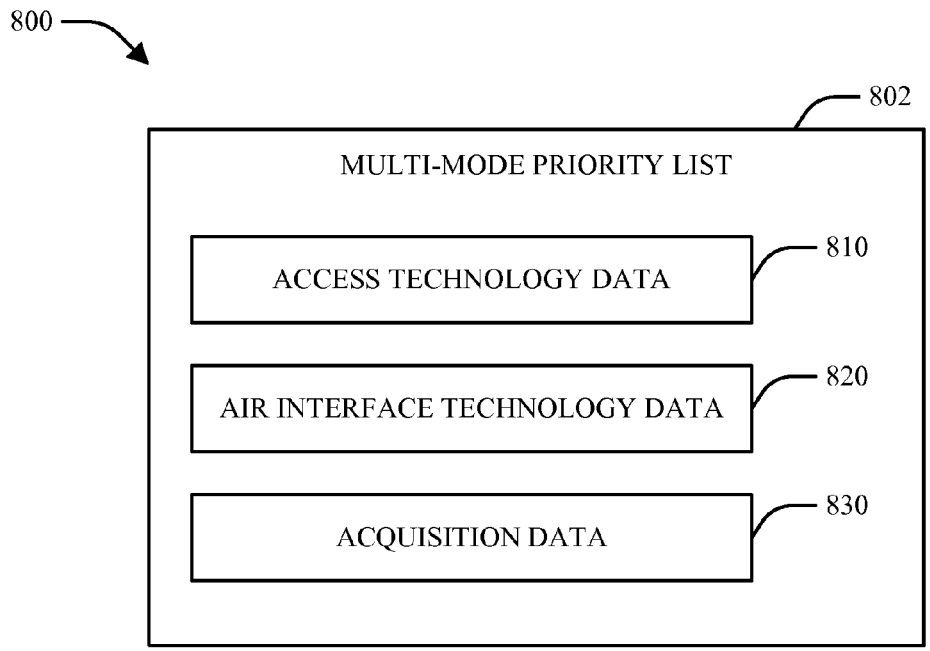
FIG. 8 is a block diagram of a system for providing enhanced priority listing information in accordance with various aspects.

Turning to FIG. 8, a system 800 for providing enhanced priority listing information in accordance with various aspects is illustrated. In one example, system 800 includes a multi-mode priority list 802, which can provide information and/or rules for prioritization of respective systems (e.g., as given by a PLMN list and/or a PRL). Multi-mode priority list can be and/or implement the functionality of, for example, a MLPL or a MSPL. As illustrated above, respective system list databases on which a multi-mode list of preferred systems is built can provide varying levels of information granularity. Thus, in accordance with one aspect, a multi-mode priority list 802 utilized as an overlay for one or more system list databases can be expanded to include additional information relating to respective systems, thereby facilitating the creating of a multi-mode system list that contains a high degree of granularity for all systems irrespective of the amount of detail provided in their respective system listings.

As FIG. 8 illustrates, a multi-mode system list 802 can be expanded to include information such as access technology data 802, air interface technology data 820, and/or acquisition data 830 corresponding to respective systems corresponding to multi-mode system list 802. It should be appreciated, however, that any suitable information could be incorporated into multi-mode priority list 802. Further, it should be appreciated that information 810-830 could be provided for all systems associated with multi-mode priority list 802 or a subset of such systems (e.g., systems associated with multi-mode priority list 802 that do not include information 810-830 in their respective system listings).

Figure 9:
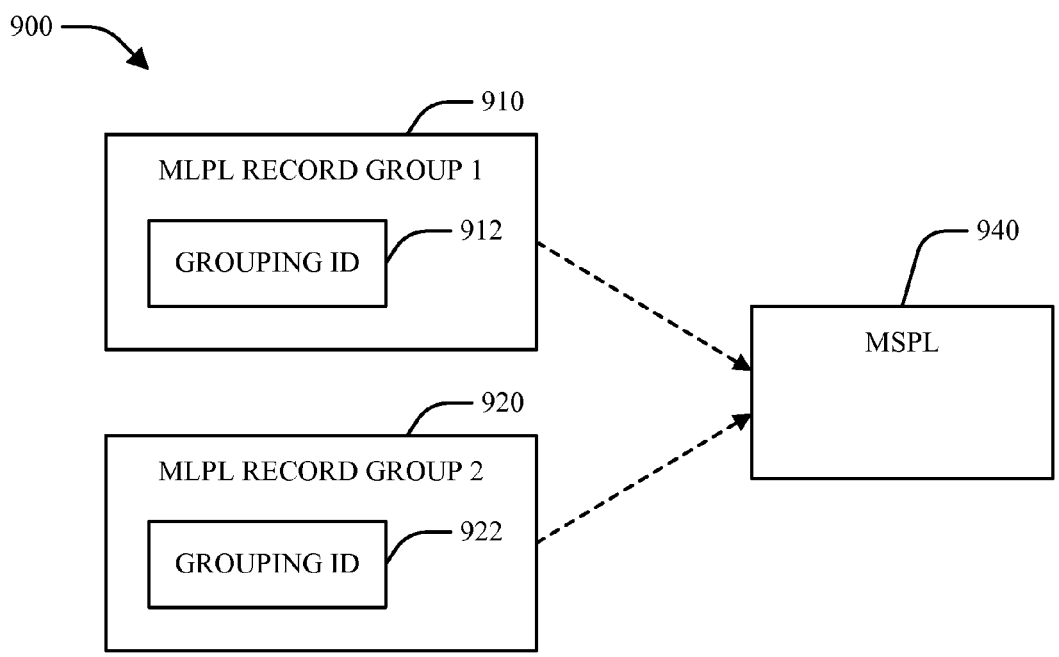
FIG. 9 is a block diagram of a system for grouping priority lists in connection with a system selection operation in accordance with various aspects.

Referring now to FIG. 9 a system 900 for grouping priority lists in connection with a system selection operation in accordance with various aspects is illustrated. As previously described above, MLPL records corresponding to respective systems can point to MSPLs that provide rules for prioritization of the respective systems. In one implementation as illustrated by system 900, groups 910 and/or 920 of multiple MLPL records can be configured to point to a single MSPL 940. This can be done, for example, to save storage space associated with two or more MLPL record groups 910 and/or 920 that utilize the same system priority listing. However, in the event that MLPL records are grouped, a terminal attempting to perform MMSS may be required to scan multiple MSPLs in order to conduct system selection. Thus, it would be desirable to provide a finer pointer from MLPL record groups 910 and/or 920 to an associated MSPL 940.

In one example, MLPLs and MSPLs can be configured such that there is a mutual one-to-one relationship between MLPLs and MSPLs. However, as noted above, this implementation will result in additional storage requirements. Alternatively, as illustrated by system 900, MLPL records can be arranged into groups 910 and/or 920, which can be assigned a grouping ID 912 and/or 922 that corresponds to a given MSPL 940. Thus, in one example, an MLPL record can have a first pointer that refers to a MSPL entry as well as a second pointer that refers to a grouping identifier for the MLPL record.

Referring now to FIGS. 10-14, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 10:
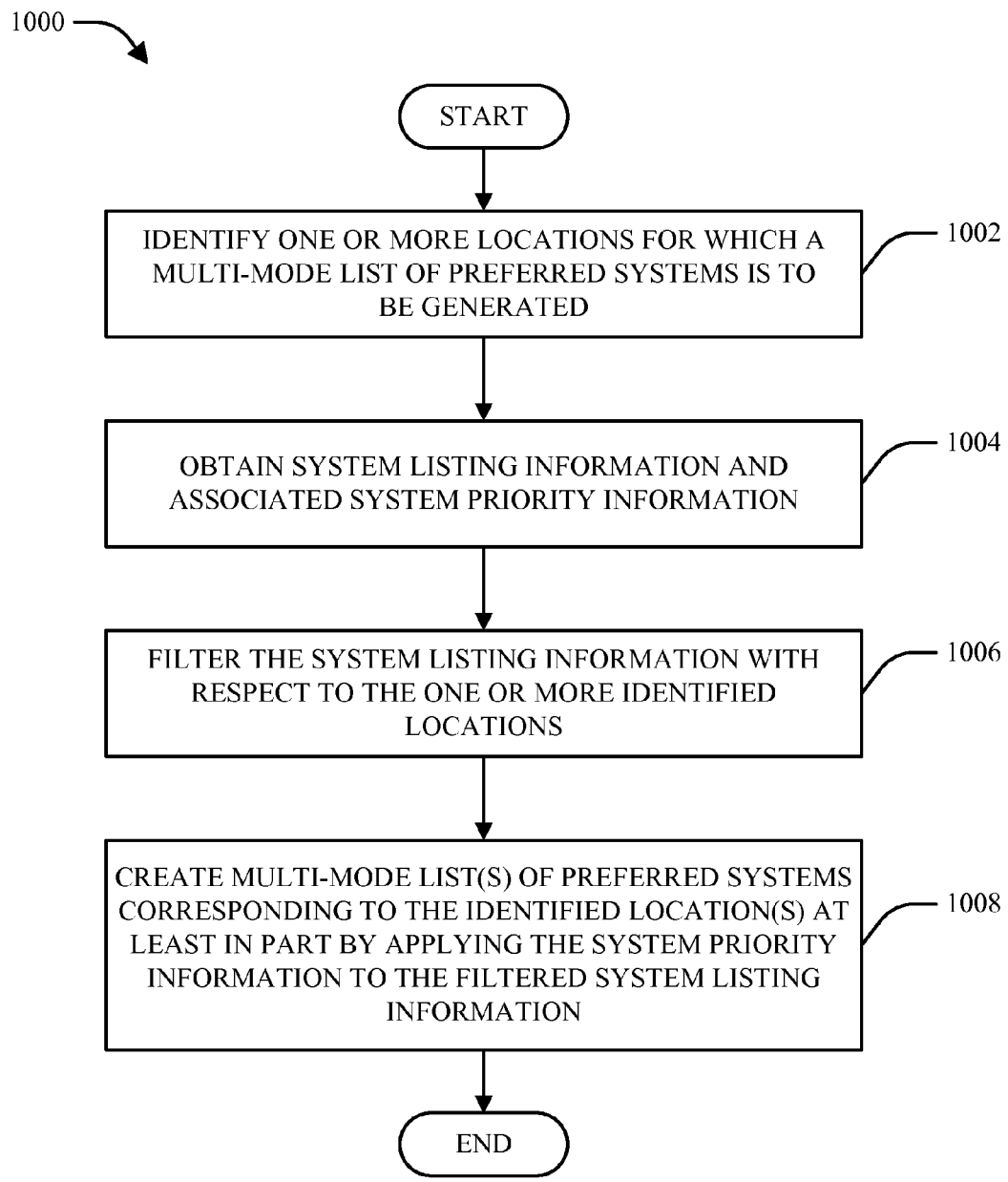
FIGS. 10-13 are flow diagrams of respective methodologies that facilitate multi-mode system selection in a wireless communication environment.

With reference to FIG. 10, illustrated is a methodology 1000 that facilitates multi-mode system selection in a wireless communication environment. It is to be appreciated that methodology 1000 can be performed by, for example, a terminal device (e.g., terminal 110) and/or any other appropriate network device. Methodology 1000 begins at block 1002, wherein one or more locations (e.g., location information 360) for which a multi-mode list of preferred systems (e.g., multi-mode list of preferred systems 380) is to be generated are identified. Next, at block 1004, system listing information (e.g., PLMN list 310 and/or PRL 320) and associated system priority information (e.g., MLPL 340 and/or MSPL database 350) are obtained. Subsequently at block 1006, the system listing information obtained at block 1004 is filtered with respect to the one or more locations identified at block 1002. Methodology 1000 can then conclude at block 1008, wherein one or more multi-mode lists of preferred systems corresponding to the location(s) identified at block 1002 are created at least in part by applying the system priority information obtained at block 1004 to the filtered system listing information generated at block 1006.

Figure 11:
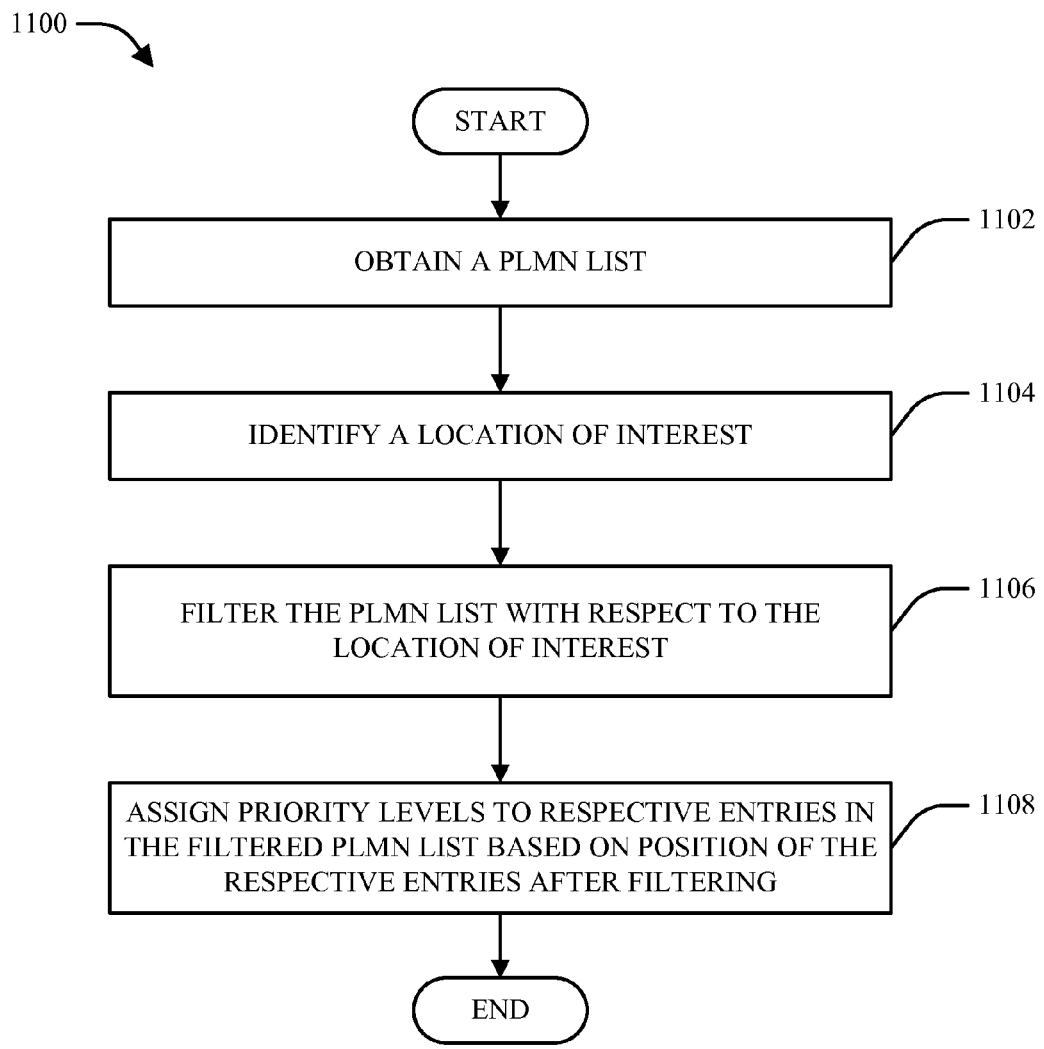

Turning to FIG. 11, a methodology 1100 is illustrated for filtering a PLMN list in association with generating a multi-mode list of preferred systems. Methodology 1100 can be performed by, for example, a UE and/or any other suitable network entity. Methodology 1100 begins at block 1102, wherein a PLMN list is obtained, and block 1104, wherein a location of interest is identified. Next, at block 1106, the PLMN list obtained at block 1102 is filtered with respect to the location of interest identified at block 1104. Finally, at block 1108, priority levels are assigned to respective entries in the filtered PLMN list based on position of the respective entries after filtering. For example, a HOME priority can be assigned to a first entry in the filtered PLMN list, a PREF priority can be assigned to a second entry, and an ALL priority can be assigned to all other entries. Alternatively, any other prioritization could be utilized.

Figure 12:
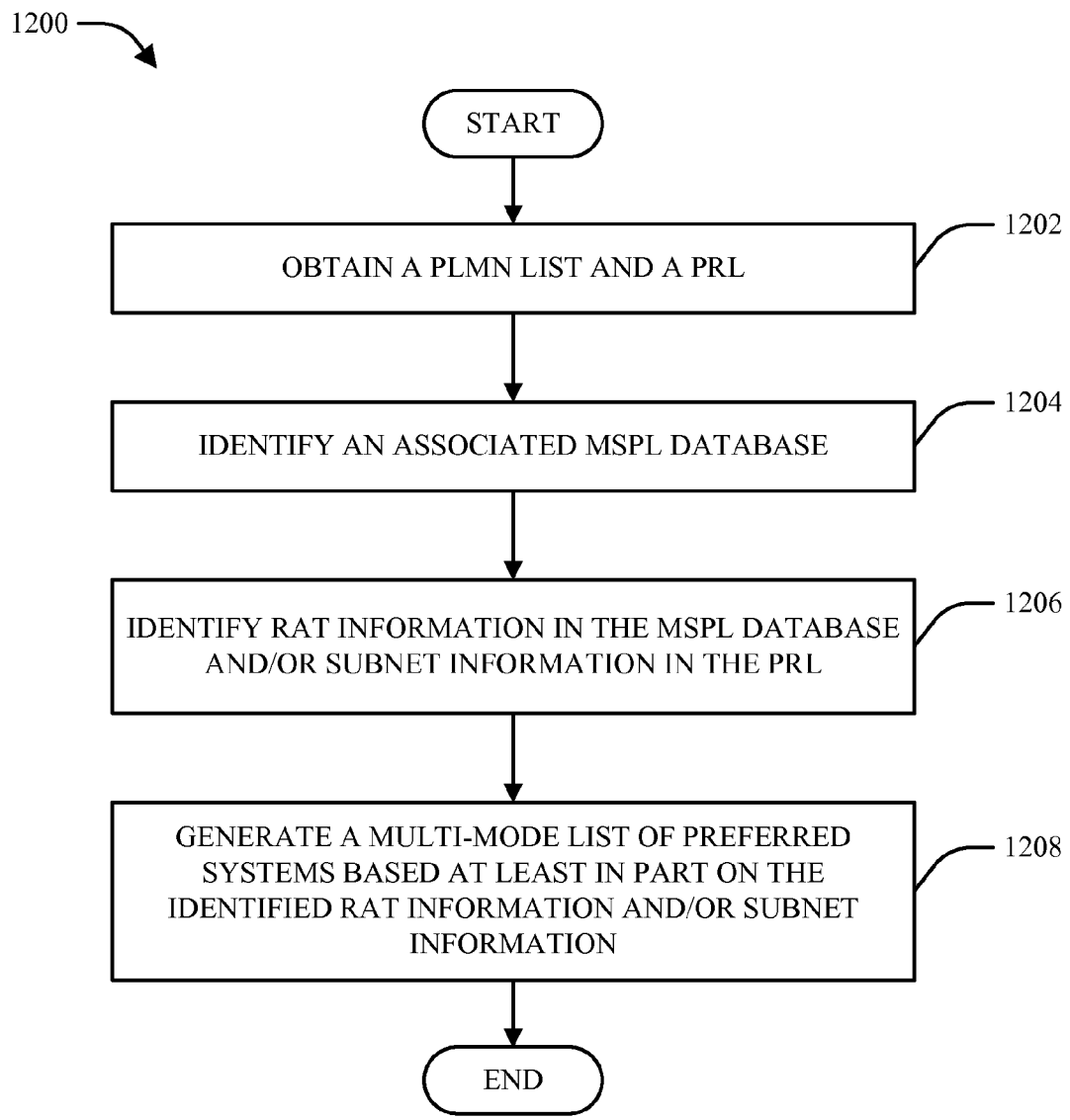

FIG. 12 illustrates a methodology 1200 for leveraging RAT information provided with one or more system listings in association with generating a multi-mode list of preferred systems. Methodology 1200 can be performed by, for example, a mobile terminal and/or any other suitable network device. Methodology 1200 begins at block 1202, wherein a PLMN list and a PRL are obtained. Next, at block 1204, an associated MSPL database is identified. Following the acts described at block 1204, methodology 1200 proceeds to block 1206, wherein RAT information in the MSPL database identified at block 1204 and/or subnet information in the PRL obtained at block 1202 is identified. Methodology 1200 can then conclude at block 1208, wherein a multi-mode list of preferred systems is generated (e.g., using systems listed in the PLMN list and/or PRL) based at least in part on the RAT and/or subnet information identified at block 1206.

Figure 13:
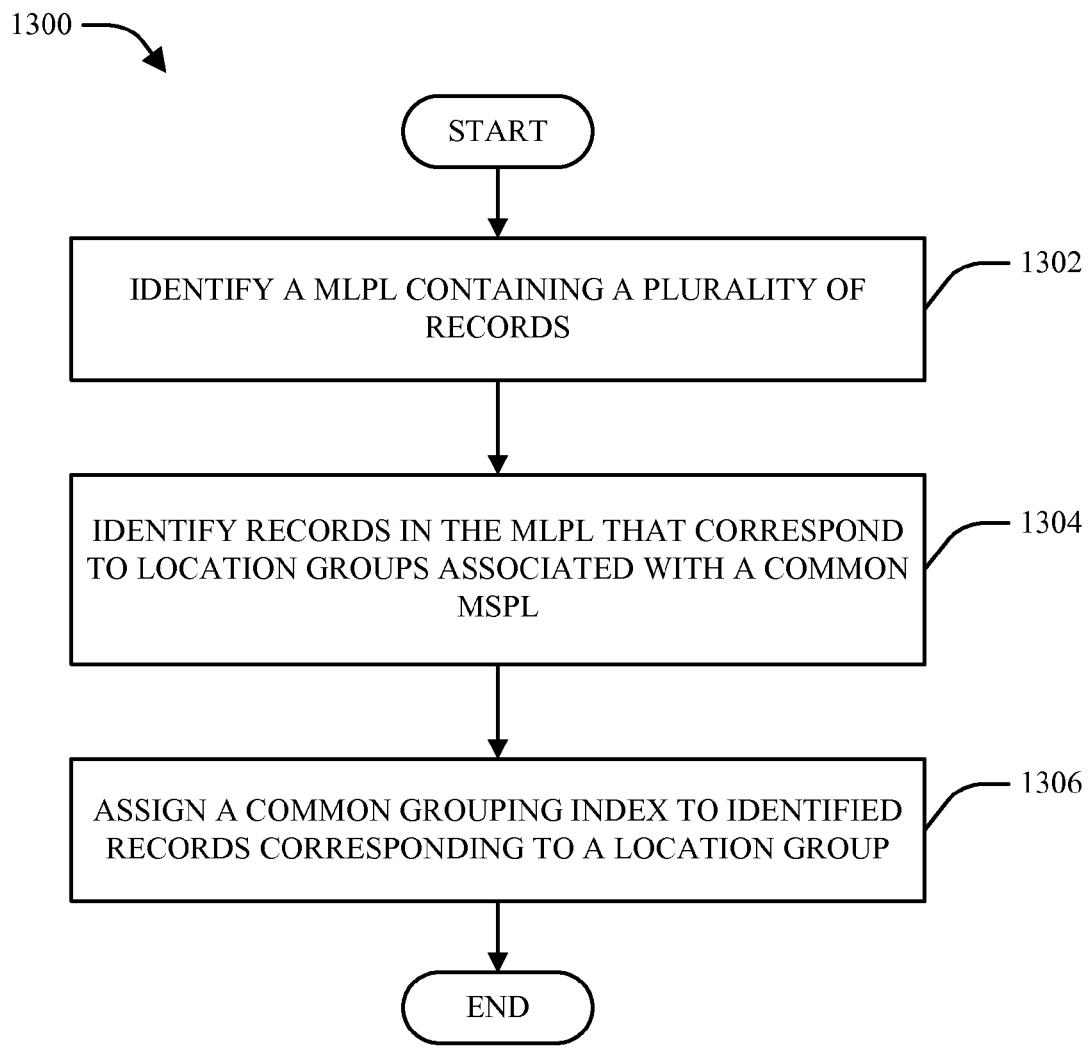

Referring next to FIG. 13, a methodology 1300 for MLPL grouping in connection with multi-mode system selection is illustrated. It is to be appreciated that methodology 1300 can be performed by, for example, a terminal and/or any other appropriate network device. Methodology 1300 begins at block 1302, wherein a MLPL containing a plurality of records is identified. Next, at block 1304, records in the MLPL that correspond to location groups associated with a common MSPL are identified. Finally, at block 1306, a common grouping index is assigned to identified records corresponding to a location group.

Figure 14:
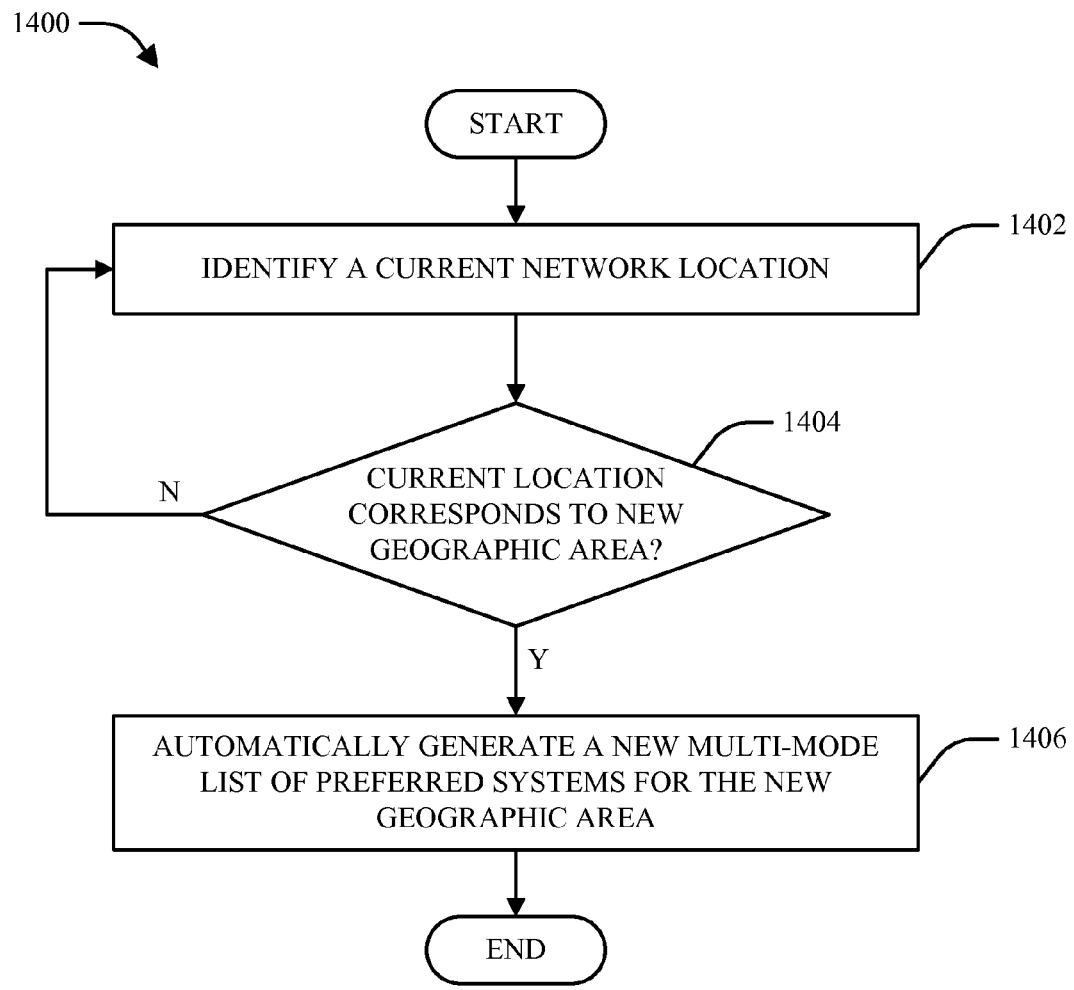
FIG. 14 is a flow diagram of a methodology for automatic generation of a preferred system list based on changes in location.

Turning to FIG. 14, illustrated is a methodology 1400 for automatic generation of a preferred system list based on changes in location. Methodology 1400 can be performed by, for example, a UE and/or any other appropriate network device. Methodology 1400 begins at block 1402, wherein a current network location is identified. Next, at block 1404, it is determined whether the current location identified at block 1402 corresponds to a new geographic area. If the current location does not correspond to a new geographic area, methodology 1400 can return to block 1402 to continue location monitoring. Alternatively, upon a positive determination at block 1404, methodology can continue to block 1406, wherein a new multi-mode list of preferred systems is automatically generated for the new geographic area.

Figure 15:
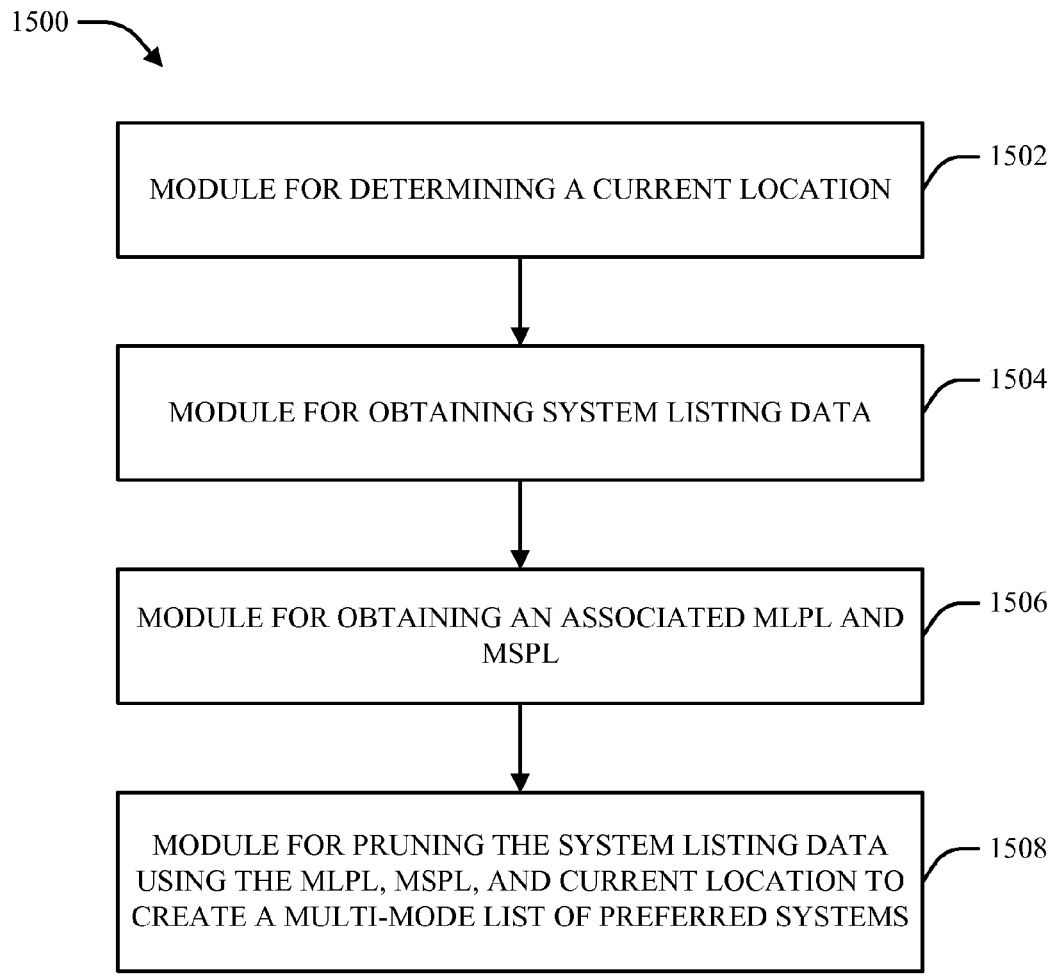
FIG. 15 is a block diagram of an apparatus that facilitates multi-mode system selection in a wireless communication system.

FIG. 15 illustrates an apparatus 1500 that facilitates multi-mode system selection in a wireless communication system. It is to be appreciated that apparatus 1500 is represented as including functional blocks, which can be functional blocks that represent functions implemented by a processor, software, or combination thereof (e.g., firmware). Apparatus 1500 can be implemented by a UE (e.g., terminal 110) and/or any other suitable network device and can include a module 1502 for determining a current location, a module 1504 for obtaining system listing data, a module 1506 for obtaining an associated MLPL and MSPL, and a module 1508 for pruning the system listing data using the MLPL, MSPL, and current location to create a multi-mode list of preferred systems.

Figure 16:
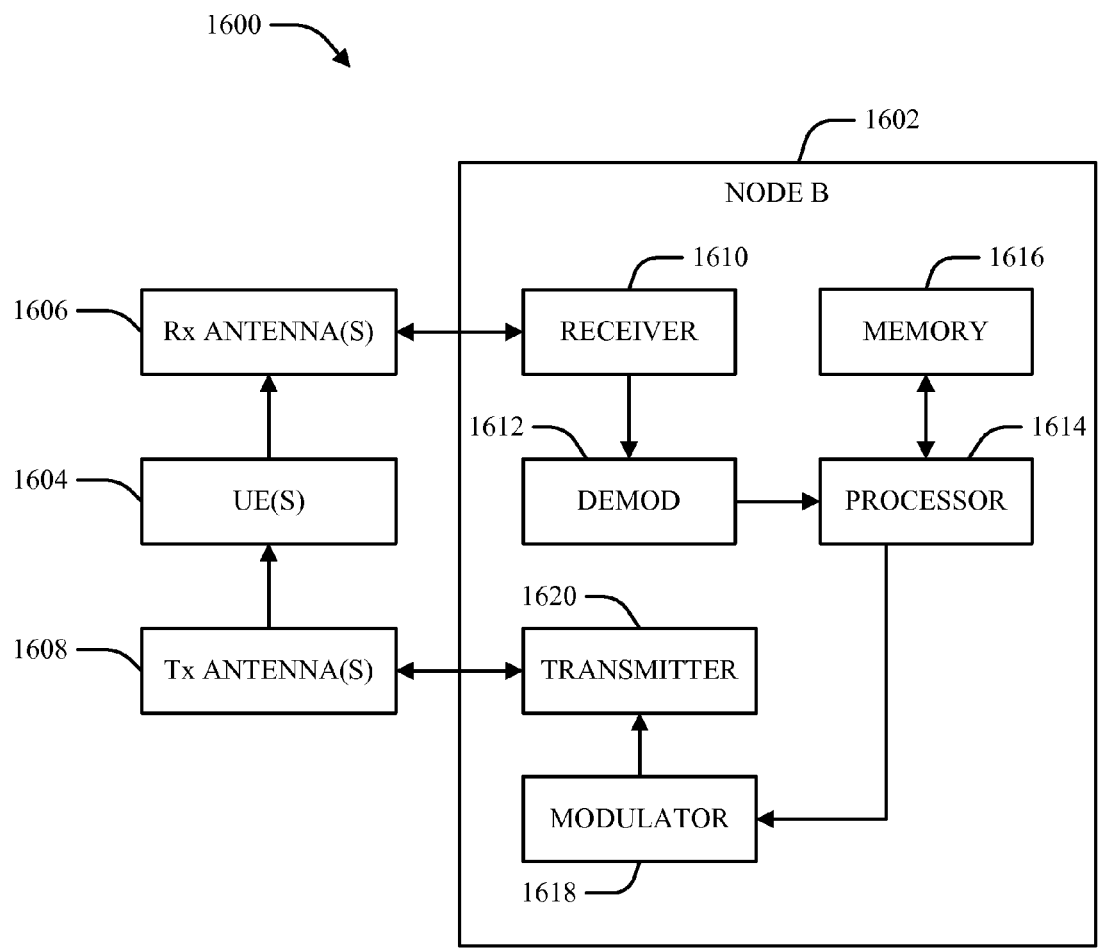
FIGS. 16-17 are block diagrams of respective wireless communication devices that can be utilized to implement various aspects of the functionality described herein.

FIG. 16 is a block diagram of a system 1600 that can be utilized to implement various aspects of the functionality described herein. In one example, system 1600 includes a base station or Node B 1602. As illustrated, Node B 1602 can receive signal(s) from one or more UEs 1604 via one or more receive (Rx) antennas 1606 and transmit to the one or more UEs 1604 via one or more transmit (Tx) antennas 1608. Additionally, Node B 1602 can comprise a receiver 1610 that receives information from receive antenna(s) 1606. In one example, the receiver 1610 can be operatively associated with a demodulator (Demod) 1612 that demodulates received information. Demodulated symbols can then be analyzed by a processor 1614. Processor 1614 can be coupled to memory 1616, which can store information related to code clusters, access terminal assignments, lookup tables related thereto, unique scrambling sequences, and/or other suitable types of information. In one example, Node B 1602 can also include a modulator 1618 that can multiplex a signal for transmission by a transmitter 1620 through transmit antenna(s) 1608.

Figure 17:
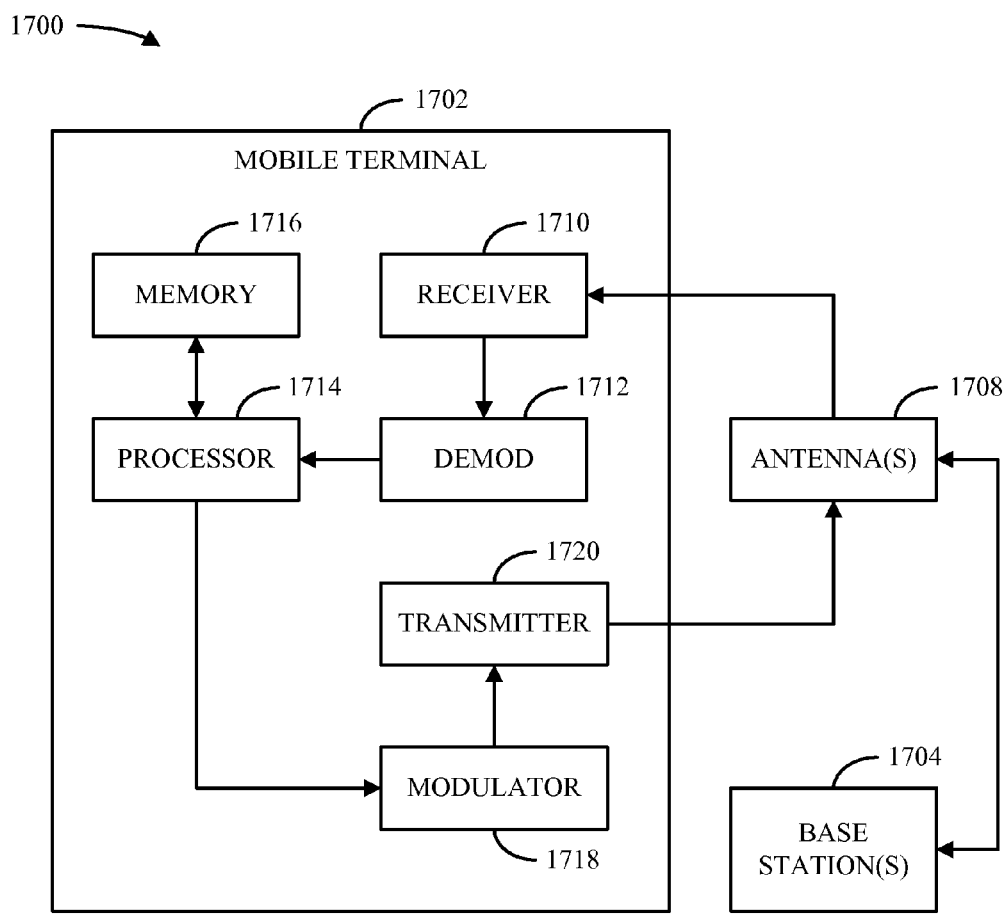

FIG. 17 is a block diagram of another system 1700 that can be utilized to implement various aspects of the functionality described herein. In one example, system 1700 includes a mobile terminal 1702. As illustrated, mobile terminal 1702 can receive signal(s) from one or more base stations 1704 and transmit to the one or more base stations 1704 via one or more antennas 1708. Additionally, mobile terminal 1702 can comprise a receiver 1710 that receives information from antenna(s) 1708. In one example, receiver 1710 can be operatively associated with a demodulator (Demod) 1712 that demodulates received information. Demodulated symbols can then be analyzed by a processor 1714. Processor 1714 can be coupled to memory 1716, which can store data and/or program codes related to mobile terminal 1702. Additionally, mobile terminal 1702 can employ processor 1714 to perform methodologies 900-1300 and/or other similar and appropriate methodologies. Mobile terminal 1702 can also include a modulator 1718 that can multiplex a signal for transmission by a transmitter 1720 through antenna(s) 1708.

Figure 18:
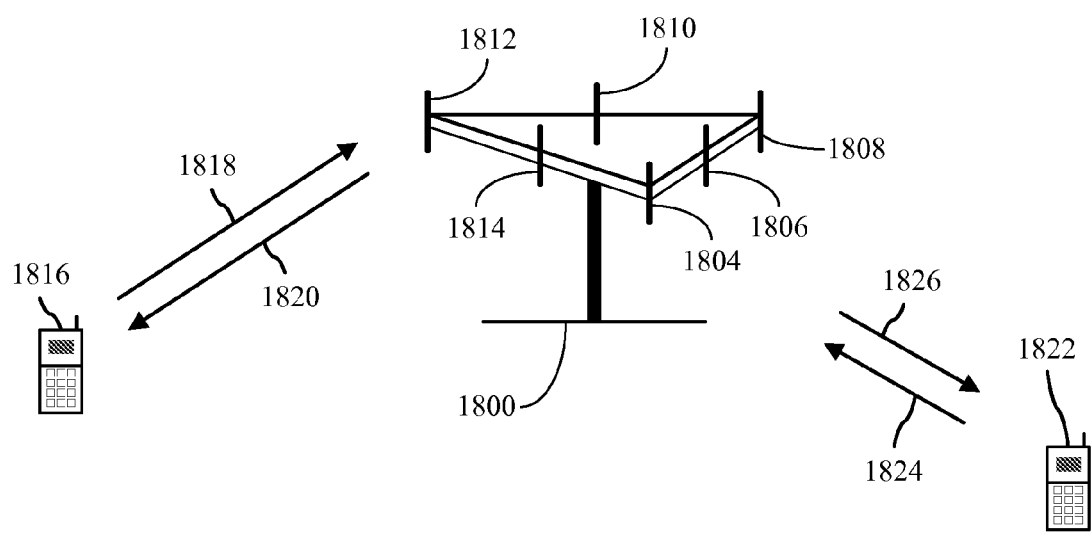
FIG. 18 illustrates a wireless multiple-access communication system in accordance with various aspects set forth herein.

Referring now to FIG. 18, an illustration of a wireless multiple-access communication system is provided in accordance with various aspects. In one example, an access point 1800 (AP) includes multiple antenna groups. As illustrated in FIG. 18, one antenna group can include antennas 1804 and 1806, another can include antennas 1808 and 1810, and another can include antennas 1812 and 1814. While only two antennas are shown in FIG. 18 for each antenna group, it should be appreciated that more or fewer antennas may be utilized for each antenna group. In another example, an access terminal 1816 can be in communication with antennas 1812 and 1814, where antennas 1812 and 1814 transmit information to access terminal 1816 over forward link 1820 and receive information from access terminal 1816 over reverse link 1818. Additionally and/or alternatively, access terminal 1822 can be in communication with antennas 1806 and 1808, where antennas 1806 and 1808 transmit information to access terminal 1822 over forward link 1826 and receive information from access terminal 1822 over reverse link 1824. In a frequency division duplex system, communication links 1818, 1820, 1824 and 1826 can use different frequency for communication. For example, forward link 1820 may use a different frequency then that used by reverse link 1818.

Each group of antennas and/or the area in which they are designed to communicate can be referred to as a sector of the access point. In accordance with one aspect, antenna groups can be designed to communicate to access terminals in a sector of areas covered by access point 1800. In communication over forward links 1820 and 1826, the transmitting antennas of access point 1800 can utilize beamforming in order to improve the signal-to-noise ratio of forward links for the different access terminals 1818 and 1822. Also, an access point using beamforming to transmit to access terminals scattered randomly through its coverage causes less interference to access terminals in neighboring cells than an access point transmitting through a single antenna to all its access terminals.

An access point, e.g., access point 1800, can be a fixed station used for communicating with terminals and can also be referred to as a base station, an eNB, an access network, and/or other suitable terminology. In addition, an access terminal, e.g. an access terminal 1816 or 1822, can also be referred to as a mobile terminal, user equipment, a wireless communication device, a terminal, a wireless terminal, and/or other appropriate terminology.

Figure 19:
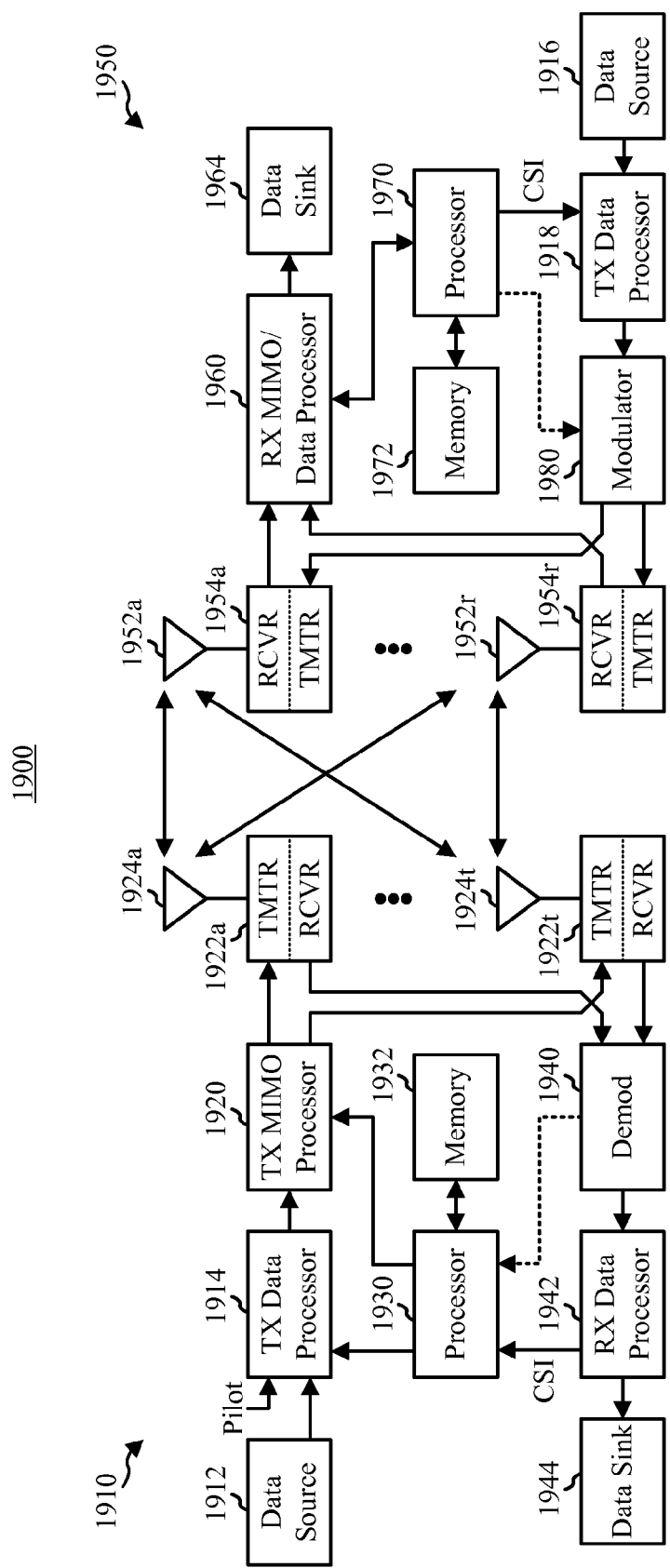
FIG. 19 is a block diagram illustrating an example wireless communication system in which various aspects described herein can function.

Referring now to FIG. 19, a block diagram illustrating an example wireless communication system 1900 in which various aspects described herein can function is provided. In one example, system 1900 is a multiple-input multiple-output (MIMO) system that includes a transmitter system 1910 and a receiver system 1950. It should be appreciated, however, that transmitter system 1910 and/or receiver system 1950 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1910 and/or receiver system 1950 described herein could be utilized in connection with a single output to single input antenna system.

In accordance with one aspect, traffic data for a number of data streams are provided at transmitter system 1910 from a data source 1912 to a transmit (TX) data processor 1914. In one example, each data stream can then be transmitted via a respective transmit antenna 1924. Additionally, TX data processor 1914 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1950 to estimate channel response. Back at transmitter system 1910, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1930.

Next, modulation symbols for all data streams can be provided to a TX processor 1920, which can further process the modulation symbols (e.g., for OFDM). TX MIMO processor 1920 can then provides $N_T$ modulation symbol streams to $N_T$ transceivers 1922a through 1922t. In one example, each transceiver 1922 can receive and process a respective symbol stream to provide one or more analog signals. Each transceiver 1922 can then further condition (e.g., amplify, filter, and upconvert) the analog signals to provide a modulated signal suitable for transmission over a MIMO channel. Accordingly, $N_T$ modulated signals from transceivers 1922a through 1922t can then be transmitted from $N_T$ antennas 1924a through 1924t, respectively.

In accordance with another aspect, the transmitted modulated signals can be received at receiver system 1950 by $N_R$ antennas 1952a through 1952r. The received signal from each antenna 1952 can then be provided to respective transceivers 1954. In one example, each transceiver 1954 can condition (e.g., filter, amplify, and downconvert) a respective received signal, digitize the conditioned signal to provide samples, and then processes the samples to provide a corresponding "received" symbol stream. An RX MIMO/data processor 1960 can then receive and process the $N_R$ received symbol streams from $N_R$ transceivers 1954 based on a particular receiver processing technique to provide $N_T$ "detected" symbol streams. In one example, each detected symbol stream can include symbols that are estimates of the modulation symbols transmitted for the corresponding data stream. RX processor 1960 can then process each symbol stream at least in part by demodulating, deinterleaving, and decoding each detected symbol stream to recover traffic data for a corresponding data stream. Thus, the processing by RX processor 1960 can be complementary to that performed by TX MIMO processor 1920 and TX data processor 1919 at transmitter system 1910. RX processor 1960 can additionally provide processed symbol streams to a data sink 1964.

In accordance with one aspect, the channel response estimate generated by RX processor 1960 can be used to perform space/time processing at the receiver, adjust power levels, change modulation rates or schemes, and/or other appropriate actions. Additionally, RX processor 1960 can further estimate channel characteristics such as, for example, signal-to-noise-and-interference ratios (SNRs) of the detected symbol streams. RX processor 1960 can then provide estimated channel characteristics to a processor 1970. In one example, RX processor 1960 and/or processor 1970 can further derive an estimate of the "operating" SNR for the system. Processor 1970 can then provide channel state information (CSI), which can comprise information regarding the communication link and/or the received data stream. This information can include, for example, the operating SNR. The CSI can then be processed by a TX data processor 1919, modulated by a modulator 1980, conditioned by transceivers 1954a through 1954r, and transmitted back to transmitter system 1910. In addition, a data source 1916 at receiver system 1950 can provide additional data to be processed by TX data processor 1919.

Back at transmitter system 1910, the modulated signals from receiver system 1950 can then be received by antennas 1924, conditioned by transceivers 1922, demodulated by a demodulator 1940, and processed by a RX data processor 1942 to recover the CSI reported by receiver system 1950. In one example, the reported CSI can then be provided to processor 1930 and used to determine data rates as well as coding and modulation schemes to be used for one or more data streams. The determined coding and modulation schemes can then be provided to transceivers 1922 for quantization and/or use in later transmissions to receiver system 1950. Additionally and/or alternatively, the reported CSI can be used by processor 1930 to generate various controls for TX data processor 1914 and TX MIMO processor 1920. In another example, CSI and/or other information processed by RX data processor 1942 can be provided to a data sink 1944.

In one example, processor 1930 at transmitter system 1910 and processor 1970 at receiver system 1950 direct operation at their respective systems. Additionally, memory 1932 at transmitter system 1910 and memory 1972 at receiver system 1950 can provide storage for program codes and data used by processors 1930 and 1970, respectively. Further, at receiver system 1950, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   identifying one or more locations associated with a wireless communication environment;
   obtaining a set of system listing information and a set of associated system priority information;
   filtering the system listing information with respect to the one or more identified locations; and
   creating a multi-mode list of preferred systems corresponding to the one or more identified locations at least in part by applying the system priority information to the filtered system listing information.

2. The method of claim 1, wherein the set of associated system priority information comprises at least one Multi-Mode System Selection (MMSS) System Priority List (MSPL) that includes system priority rules for one or more system types and at least one MMSS Location Priority List (MLPL) that relates a communication system to a corresponding MSPL.

3. The method of claim 2, wherein the set of system listing information comprises a Public Land Mobile Network (PLMN) list and a Preferred Roaming List (PRL).

4. The method of claim 3, wherein the PLMN list comprises an Equivalent Home PLMN (EHPLMN) list and an Operator PLMN (OPLMN) list and the EHPLMN list and OPLMN list respectively comprise records of systems identified by Mobile Country Code (MCC) and Mobile Network Code (MNC).

5. The method of claim 4, wherein:
   the filtering further comprises generating a location group at least in part by selecting listings from the EHPLMN list and the OPLMN list having respective MCCs that match that of an identified location and selecting listings from the PRL corresponding to a geo-spatial location (GEO) that matches that of the identified location; and
   the method further comprises assigning priority levels to respective entries in the location group as a function of position within the location group at least in part by applying a home priority level to a first PLMN list and PRL entries in the location group, a preferred priority level to a second PLMN list and PRL entries in the location group, and one or more priority levels to respective other PLMN list and PRL entries in the location group.

6. The method of claim 5, further comprising:
   identifying respective MLPL records corresponding to a common location group; and
   assigning a common group identifier to the identified MLPL records.

7. The method of claim 1, wherein the creating comprises:
   identifying priority groups comprising respective subsets of filtered system listing information, the priority groups corresponding to at least a home priority class, a preferred priority class, and one or more additional priority classes; and interleaving the respective priority groups using the obtained set of system priority information.

8. The method of claim 7, wherein the obtained set of system priority information specifies a priority order for system classes defined at least in part by one or more of radio access technology (RAT) or subnet identifier and the interleaving comprises interleaving the respective priority groups according to a system priority order specified by the obtained set of system priority information.

9. The method of claim 8, wherein the system listing information comprises a PRL containing entries associated with respective communication networks and subnets associated with the respective communication networks.

10. The method of claim 1, wherein at least one of the system priority information or the system listing information includes supplemental information comprising at least one of access technology data, air interface technology data, or acquisition data.

11. The method of claim 10, further comprising augmenting at least a portion of the created multi-mode list of preferred systems with the supplemental information.

12. The method of claim 1, wherein the identifying comprises identifying a location for which a multi-mode list of preferred systems has not been created and the filtering and creating are automated to create a multi-mode list of preferred systems for the identified location.

13. A wireless communications apparatus, comprising:
a memory that stores data relating to one or more locations, one or more system listing databases, and related system priority information; and
a processor configured to prune the one or more system listing databases with respect to the one or more locations and to create a multi-mode preferred system listing by applying the system priority information to the pruned system listing databases.

14. The wireless communications apparatus of claim 13, wherein the system priority information comprises at least one Multi-Mode System Selection (MMSS) System Priority List (MSPL) that includes system priority rules for one or more system types and at least one MMSS Location Priority List (MLPL) that relates a communication system to a corresponding MSPL.

15. The wireless communications apparatus of claim 14, wherein the one or more system listing databases comprise a Public Land Mobile Network (PLMN) list and a Preferred Roaming List (PRL).

16. The wireless communications apparatus of claim 15, wherein:
the PLMN list comprises an Equivalent Home PLMN (EHPLMN) list and an Operator PLMN (OPLMN) list and the EHPLMN list and OPLMN list respectively comprise records of systems identified by Mobile Country Code (MCC) and Mobile Network Code (MNC); and
the PRL comprises records of respective systems in relation to locations at which the systems are located.

17. The wireless communications apparatus of claim 16, wherein the processor is further configured to create a location group by selecting listings from the EHPLMN list and the OPLMN list having respective MCCs that match that of the one or more locations and selecting listings from the PRL corresponding to a location that matches the one or more locations and to assign priority levels to respective entries in the location group as a function of position within the location group.

18. The wireless communications apparatus of claim 17, wherein the processor is further configured to assign a HOME priority level to a first PLMN entry and a first PRL entry in the location group, to assign a preferred priority level to a second PLMN entry and a second PRL entry in the location group, and to assign at least one additional priority level to one or more other entries in the location group.

19. The wireless communications apparatus of claim 17, wherein the processor is further configured to identify MLPL records corresponding to a common location group and to assign a group identifier to the identified MLPL records.

20. The wireless communications apparatus of claim 13, wherein the processor is further configured to create the multi-mode preferred system listing at least in part by identifying priority groups from one or more pruned system listing databases and interleaving the respective priority groups using the system priority information.

21. The wireless communications apparatus of claim 20, wherein the system priority information specifies a priority order for system types defined at least in part as a function of radio access technology (RAT) or subnet identifier, and the processor is further configured to interleave the respective priority groups according to the priority order.

22. The wireless communications apparatus of claim 21, wherein the one or more system listing databases comprise a PRL containing entries associated with respective communication networks and subnets associated with the respective communication networks.

23. The wireless communications apparatus of claim 13, wherein the processor is further configured to identify a location for which a multi-mode preferred system listing has not been created and to automate creation of a multi-mode preferred system listing for the identified location.

24. An apparatus operable in a wireless communication system, the apparatus comprising:
means for determining one or more locations within a wireless communication environment;
means for obtaining system listing data and system prioritization data;
means for pruning the system listing data with respect to the one or more locations; and
means for creating a multi-mode list of preferred systems at least in part by applying the system prioritization data to the pruned system listing data.

25. The apparatus of claim 24, wherein the system prioritization data comprises at least one Multi-Mode System Selection (MMSS) Location Priority List (MLPL) record and at least one MMSS System Priority List (MSPL).

26. The apparatus of claim 25, further comprising:
means for identifying priority level information in the at least one MSPL, wherein the priority level information is expressed in terms of at least one of system type or network operator; and
means for identifying respective relationships between communication systems and corresponding MSPLs in the at least one MLPL record.

27. The apparatus of claim 25, wherein the system listing data comprises a Public Land Mobile Network (PLMN) list that includes an Equivalent Home PLMN (EHPLMN) list and an Operator PLMN (OPLMN) list that each respectively comprise records of systems identified by Mobile Country Code (MCC) and Mobile Network Code (MNC) and a Preferred Roaming List (PRL) that comprises records of systems in relation to geo-spatial locations (GEOs) at which the systems reside.

28. The apparatus of claim 27, wherein the means for creating comprises:
  means for generating a location group by selecting listings from the EHPLMN list and the OPLMN list having respective MCCs that match that of the one or more locations and selecting listings from the PRL corresponding to a GEO that matches that of the one or more locations; and
  means for assigning priority levels corresponding to the at least one MSPL to respective entries in the location group as a function of position within the location group, wherein the priority levels comprise at least a first priority level applied to a first PLMN list and PRL entries in a location group, a second priority level applied to a second PLMN list and PRL entries in the location group, and one or more third priority levels applied to respective other entries in the location group.

29. The apparatus of claim 28, further comprising means for assigning a group identifier to respective MLPL records corresponding to a common location group.

30. The apparatus of claim 24, wherein the system prioritization data specifies a priority order for system classes defined at least in part by one or more of radio access technology (RAT) or subnet identifier and the means for creating comprises:
  means for identifying priority groups comprising respective subsets of filtered system listing data; and
  means for interleaving the respective priority groups according to the priority order specified by the system prioritization data.

31. The apparatus of claim 30, wherein the system listing data comprises a PRL that comprises entries associated with respective communication networks and subnets associated with the respective communication networks.

32. The apparatus of claim 24, wherein the means for identifying location information comprises means for identifying a location of the apparatus and the apparatus further comprises:
  means for determining whether a multi-mode list of preferred systems corresponding to the location of the apparatus has been created; and
  means for automating creation of a multi-mode list of preferred systems for the location of the apparatus upon determining that a multi-mode list of preferred systems corresponding to the location of the apparatus has not been created.

33. A non-transitory computer-readable medium, comprising:
  code for causing a computer to identify one or more locations of interest within a wireless communication environment;
  code for causing a computer to obtain system listing information and system priority information;
  code for causing a computer to filter the system listing information with respect to the one or more locations of interest; and
  code for causing a computer to apply the system priority information to the filtered system listing information.

34. The non-transitory computer-readable medium of claim 33, wherein the system listing information comprises at least one of a Public Land Mobile Network (PLMN) list or a Preferred Roaming List (PRL) and the system priority information comprises at least one of a Multi-Mode System Selection (MMSS) Location Priority List (MLPL) containing at least one record or a MMSS System Priority List (MSPL).

35. The non-transitory computer-readable medium of claim 34, wherein the computer-readable medium further comprises:
  code for causing a computer to identify priority level information in an MSPL, wherein the priority level information is expressed in terms of at least one of radio access technology (RAT) or network operator; and
  code for causing a computer to identify respective relationships between communication systems and corresponding MSPLs in at least one record of an MLPL.

36. The non-transitory computer-readable medium of claim 35, wherein the system listing information comprises a PLMN list and a PRL, the PLMN list includes an Equivalent Home PLMN (EHPLMN) list and an Operator PLMN (OPLMN) list that each respectively comprise records of systems identified by Mobile Country Code (MCC) and Mobile Network Code (MNC), and the PRL includes records of systems in relation to respective geographic locations.

37. The non-transitory computer-readable medium of claim 36, wherein:
  the code for causing a computer to filter comprises code for causing a computer to create a location group using the PLMN list and the PRL at least in part by selecting listings from the EHPLMN list and the OPLMN list having respective MCCs that match that of the one or more locations of interest and selecting listings from the PRL that are associated with a geographic location that matches one or more of the locations of interest; and
  the code for causing a computer to apply the system priority information comprises code for causing a computer to assign priority levels corresponding to a MSPL to respective entries associated with the location group as a function of position within the location group, wherein the priority levels comprise at least a first priority level applied to a first PLMN list and PRL entries in a location group, a second priority level applied to a second PLMN list and PRL entries in the location group, and one or more third priority levels applied to respective other entries in the location group.

38. The non-transitory computer-readable medium of claim 37, further comprising code for causing a computer to assign a group identifier to respective MLPL records corresponding to a common location group.

39. The non-transitory computer-readable medium of claim 33, wherein the system priority information specifies a priority order for system classes defined at least in part by one or more of radio access technology (RAT) or subnet identifier.

40. The non-transitory computer-readable medium of claim 33, wherein the system listing information comprises a PRL that comprises entries associated with respective communication networks and subnets associated with the respective communication networks.

41. The non-transitory computer-readable medium of claim 33, wherein the code for causing a computer to apply the system priority information comprises:
  code for causing a computer to organize filtered system listing information into respective priority groups; and
  code for causing a computer to interleave the respective priority groups in an order specified by the system priority information.

42. An integrated circuit that executes computer-executable instructions, the instructions, when executed, causing the integrated circuit to perform operations comprising:
  identifying one or more locations of interest, one or more system listing databases, and one or more system priority databases;

pruning the one or more system listing databases with respect to the one or more locations of interest; and creating a multi-mode preferred system listing by applying information in the one or more system priority databases to respective pruned system listing databases.

43. The integrated circuit of claim 42, wherein the system listing databases comprise at least one of a Public Land Mobile Network (PLMN) list or a Preferred Roaming List (PRL) and the system priority databases comprise at least one of a Multi-Mode System Selection (MMSS) Location Priority List (MLPL) or a MMSS System Priority List (MSPL).

44. The integrated circuit of claim 43, wherein the instructions further cause the integrated circuit to perform operations comprising:
    identifying priority level information in an MSPL, wherein the priority level information is expressed in terms of at least one of radio access technology (RAT) or network operator; and
    identifying relationships between communication systems and corresponding MSPLs in at least one record of an MLPL.

45. The integrated circuit of claim 44, wherein the system listing databases comprise a PLMN list and a PRL, the PLMN list includes an Equivalent Home PLMN (EHPLMN) list and an Operator PLMN (OPLMN) list configured such that the EHPLMN list and the OPLMN list respectively comprise records of systems identified by Mobile Country Code (MCC) and Mobile Network Code (MNC), and the PRL includes records of systems in relation to respective geographic locations.

46. The integrated circuit of claim 45, wherein:
    the pruning comprises creating a location group at least in part by selecting listings from the EHPLMN list and the OPLMN list having respective MCCs that match that of the one or more locations of interest and selecting listings from the PRL that are associated with a geographic location that matches a location of interest; and
    the creating comprises assigning priority levels corresponding to a MSPL to respective entries associated with the location group as a function of relative preference within the location group, wherein the priority levels comprise at least a first priority level applied to a first PLMN list and PRL entries in a location group, a second priority level applied to a second PLMN list and PRL entries in the location group, and one or more third priority levels applied to respective other entries in the location group.

47. The integrated circuit of claim 46, wherein the instructions further cause the integrated circuit to perform operations comprising assigning a group identifier to respective MLPL records corresponding to a common location group.

48. The integrated circuit of claim 42, wherein the system priority databases specify a priority order for respective system classes defined at least in part by one or more of radio access technology (RAT) or subnet identifier.

49. The integrated circuit of claim 42, wherein the system listing databases comprise a Preferred Roaming List (PRL) that contains entries associated with respective communication networks and subnets associated with the respective communication networks.

50. The integrated circuit of claim 42, wherein the creating comprises:
    organizing information corresponding to filtered system listing databases into respective priority groups; and
    interleaving the respective priority groups in an order determined by the one or more system priority databases.

* * * * *